US008857489B2

United States Patent
Matsuyama et al.

(10) Patent No.: US 8,857,489 B2
(45) Date of Patent: Oct. 14, 2014

(54) METHOD OF AND APPARATUS FOR MANUFACTURING A TIRE BEAD

(75) Inventors: Toshiya Matsuyama, Osaka (JP); Toshiyuki Tanaka, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 13/236,727

(22) Filed: Sep. 20, 2011

(65) Prior Publication Data

US 2012/0024480 A1   Feb. 2, 2012

Related U.S. Application Data

(62) Division of application No. 12/374,023, filed as application No. PCT/JP2006/314473 on Jul. 21, 2006.

(51) Int. Cl.
*B29D 30/48* (2006.01)

(52) U.S. Cl.
CPC .......... *B29D 30/48* (2013.01); *B29D 2030/482* (2013.01)
USPC ............................ 156/398; 156/422; 156/460

(58) Field of Classification Search
CPC ................. B29D 2030/0044; B29D 2030/481; B29D 2030/482; B29D 2030/487; B29D 2030/488; B29D 30/48
USPC ................... 156/131, 135, 136, 398, 422, 460
See application file for complete search history.

(56) References Cited

U.S. PATENT DOCUMENTS

| | | | |
|---|---|---|---|
| 4,226,663 A * | 10/1980 | Pirovano et al. | 156/422 |
| 4,354,892 A | 10/1982 | Tarantola et al. | |
| 4,933,034 A * | 6/1990 | Kokubu et al. | 156/136 |
| 4,990,212 A * | 2/1991 | Pizzorno | 156/398 |
| 4,994,136 A | 2/1991 | Pizzorno | |
| 5,328,533 A * | 7/1994 | Yasuno et al. | 156/136 |
| 5,735,995 A | 4/1998 | Bull et al. | |
| 2006/0102270 A1 | 5/2006 | Suzuki | |

FOREIGN PATENT DOCUMENTS

| | | |
|---|---|---|
| GB | 1597199 A | 9/1981 |
| JP | 54-088979 A | 7/1979 |
| JP | 64-090736 A | 4/1989 |
| JP | 02-020331 A | 1/1990 |

(Continued)

OTHER PUBLICATIONS

International Search Report of PCT/JP2006/314473; Mailing dated of Oct. 17, 2006.

(Continued)

*Primary Examiner* — Geoffrey L Knable
(74) *Attorney, Agent, or Firm* — Westerman, Hattori, Daniels & Adrian, LLP

(57) ABSTRACT

A triangular-shaped can be held in an upright posture to be stuck to an outer peripheral surface of a bead core and a leading end and a trailing end can be butted against each other a crack. A filler rubber is held uprightly to be wound around an outer peripheral surface of a bead core supported by a rotary support body, and in joining a leading end and a trailing end of the filler rubber cut to a predetermined length, the neighborhood of the leading end and the neighborhood of the trailing end, respectively, are interposed by first and second interposing means and one of the interposing means is displaced toward the other from a state, in which the leading end and the trailing end are opposed to each other whereby end surfaces of the leading end and the trailing end are butted against each other.

6 Claims, 20 Drawing Sheets

(56) References Cited

FOREIGN PATENT DOCUMENTS

| | | | |
|---|---|---|---|
| JP | 06-297603 A | | 10/1994 |
| JP | 08-142227 A | | 6/1996 |
| JP | 10-291261 A | * | 11/1998 |
| JP | 2002-096401 A | | 4/2002 |
| JP | 2003-127249 A | | 5/2003 |

OTHER PUBLICATIONS

U.S. Final Office Action dated May 9, 2012 in corresponding U.S. Appl. No. 12/374,023 (14 pgs).

U.S. Non-Final Office Action dated Oct. 5, 2012 in corresponding U.S. Appl. No. 12/374,023 (9 pgs).

U.S. Office Action dated Jun. 11, 2013 in corresponding U.S. Appl. No. 12/374,023, 12 pp.

U.S. Office Action dated Nov. 9, 2011, U.S. Appl. No. 12/374,023.

U.S. Office Action dated Dec. 18, 2013, issued in corresponding U.S. Appl. No. 12/374,023, 11 pages.

U.S. Final Office Action dated Jul. 31, 2014, issued in related U.S. Appl. No. 12/374,023 (16 pages).

* cited by examiner

METHOD OF AND APPARATUS FOR MANUFACTURING A TIRE BEAD

CROSS-REFERENCE TO RELATED APPLICATIONS

This application is a Divisional of application Ser. No. 12/374,023, filed Apr. 3, 2009, and wherein application Ser. No. 12/374,023 is a national stage application filed under 35 USC §371 of International Application No. PCT/JP2006/314473, filed Jul. 21, 2006, the contents of which are incorporated herein by reference in their entirety.

TECHNICAL FIELD OF THE INVENTION

The present invention relates to a method of and an apparatus for manufacturing a tire bead having a filler rubber stuck to an outer peripheral surface of a bead core.

BACKGROUND ART

A tire is formed by combining a plurality of rubber members and a plurality of reinforcement members made mainly of steel or synthetic fiber cord, and bead portions as assembled to a rim are formed on both inner peripheral portions of a tire.

Embedded in the bead portion is a tire bead formed by sticking a band-shaped rubber member (referred to as filler rubber in the invention), which is triangular-shaped (mainly, longitudinally triangular-shaped in cross section) in cross section and referred to as bead filler or the like, to a diametrically, outer peripheral surface of a bead core formed by winding mainly a steel wire in a circular-ring shaped configuration.

Conventionally, while the tire bead B is manufactured by sticking a filler rubber F, which is extrusion-molded to be triangular-shaped in cross section, to an outer peripheral surface of a ring-shaped bead core C as shown in FIG. 21, the filler rubber F being triangular-shaped in cross section is extrusion-molded to be lengthy, and so it is general to stick the filler rubber to an outer peripheral surface of the bead core C to cut the same to a length corresponding to a single circumference of an outer periphery of the bead core C to join a leading end and a trailing end as cut.

As shown in FIG. 22, however, in the case where the filler rubber F extrusion-molded to have a width in a radial direction and a triangular-shaped, cross section is wound round the outer peripheral surface of the ring-shaped bead core C in an upright posture to be cut and a leading end F1 and a trailing end F2 thereof are butted against each other to be joined, an outer edge of the filler rubber F increased in circumferential length in the course of being wound round the bead core C is pulled, so that the leading end F1 tends to be made oblique to the outer peripheral surface of the core (chain line in the figure). Therefore, unless a butting method, in which a configuration of the leading end F1 being made oblique is taken into consideration, is adopted, it is difficult to butt and join the filler rubber F in a state of being held in an upright posture to the outer peripheral surface of the bead core C and if the filler rubber is temporarily joined, crack is liable to generate on an outer edge side of a joined portion J.

Therefore, various proposals have been made in recent years as a method of and an apparatus for sticking a filler rubber to a bead core. For example, Patent Document 1 discloses a method of and an apparatus for supplying a lengthy filler rubber, which is extrusion-molded to be triangular-shaped in cross section, to a former, of which an outer peripheral surface is tapered and inclined, using a robot hand to move a trailing end, which is cut to a predetermined length, toward a leading end, positioning the trailing end and the leading end in an overlapping manner, and clamping the overlapped portions to join the same.

In the proposal described above, however, the leading end and the trailing end are caused to overlap on the tapered, inclined surface of the former, and the overlapped portions are pushed against the inclined surface of the former to be joined together. Therefore, a surplus quantity of rubber is needed for the joining and the rubber bulges out even when forming is made after joining. In particular, in the case where the filler rubber is lengthened on an outer edge side to ensure a sufficient, circumferential length, there is caused a problem that overlap is increased on a base side (toward a core) of the filler rubber and degradation in weight balance is brought about.

Also, Patent Documents 2 and 3 disclose supplying a filler rubber, which is triangular-shaped in cross section, in a state of falling sidelong to stick the same to an outer peripheral surface of a bead core while rotating the bead core, when predetermined angle is rotated, cutting the filler rubber to a predetermined length, moving a leading end and a trailing end to a stationary plate, reversely rotating the bead core with the leading end pushed against the stationary plate, elongating a leading end side of the filler rubber, and joining the leading end and the trailing end.

In this case, the filler rubber in a state of falling sidelong is stuck to the bead core and the ends are joined together, so that it is not easy to stand the filler rubber, which is put in a state of falling sidelong, in a radial direction after the joining and there is a fear of obstruction in conveyance to a tire molding process and tire molding. Besides, since the leading end and the trailing end are overlapped and joined, there is a fear that degradation in weight balance is brought about.

Patent Document 1: JP-A-6-297603
Patent Document 2: JP-A-8-142227
Patent Document 3: JP-A-2003-127249

DISCLOSURE OF THE INVENTION

Problems to be Solved by the Invention

In order to solve such problem, the invention provides a method of and an apparatus for manufacturing a tire bead enabling efficiently and surely sticking a filler rubber, which is triangular-shaped in cross section, in an upright posture to an outer peripheral surface of a bead core, and in particular, enabling surely butting a leading end and a trailing end as cut without the generation of crack and hence enabling achieving an improvement in producibility of a tire bead.

Measure for Solving the Problems

The invention solving the problems provides a method of manufacturing a tire bead formed by sticking a filler rubber in an upright posture, which is extrusion-molded to be triangular-shaped in cross section, to an outer peripheral surface of a ring-shaped bead core, the method comprising holding the filler rubber in an upright posture to wind the same around the outer peripheral surface of the ring-shaped bead core supported by a rotary support body keeping with rotation of the bead core, at the time of joining a leading end and a trailing end of the filler rubber cut to a length corresponding to a single circumference of the core outer periphery, having first interposing means and second interposing means interposing the neighborhood of the leading end and the neighborhood of the trailing end to oppose the leading end and the trailing end to each other on the outer peripheral surface of the bead core and displacing at least one of the interposing means toward the other from the opposed state to butt end surfaces of the leading end and the trailing end of the filler rubber against each other to join the same. Thereby, end surfaces of a leading end and a trailing end of the filler rubber wound around an outer peripheral surface of a bead core in an upright posture can be butted against each other while being held in an upright posture to be surely joined.

In the method of manufacturing a tire bead, the first interposing means interposing the neighborhood of the leading end of the filler rubber interposes the leading end of the filler rubber, which is inclined rearward in a direction of rotation due to winding around the outer peripheral surface of the bead core, in a direction conformed to the inclination, displaces the leading end toward the other so as to elongate the same much as it goes toward an outer edge of the filler rubber, from a state of being opposed to the trailing end on an outer edge side with a spacing therebetween, and butting end surfaces of the leading end and the trailing end of the filler rubber against each other. Thereby, no crack is generated on an outer edge side of a joint portion formed by butting the leading end and the trailing end against each other, joining can be made surely without the generation of an excessive overlapping and excessive bulging-out of rubber.

Also, the invention provides a method of manufacturing a tire bead formed by sticking a filler rubber in an upright posture, which is extrusion-molded to be triangular-shaped in cross section, to an outer peripheral surface of a ring-shaped bead core, the method comprising forwarding the filler rubber, which is supplied in a lengthy configuration, tangentially to a reference position, in which sticking to the outer peripheral surface of the bead core begins, in an upright posture in a state, in which the bead core is supported from inside by a rotary support body, having pinch rollers pushing both sides of a base of the filler rubber to stick the same to the outer peripheral surface of the bead core while winding is made keeping with rotation of the bead core by the rotary support body, when the leading end of the filler rubber reaches a position of a predetermined angle of rotation less than a single circumference from the reference position, stopping rotation by the rotary support body, having first interposing means interposing the neighborhood of the leading end, having second interposing means interposing the neighborhood of the trailing end of the filler rubber having a length corresponding to a single circumference of an outer periphery of the bead core to cut the same to a length corresponding to the single circumference, having the second interposing means moving the trailing end thus cut to a position opposed to the leading end on the outer periphery of the bead core, and displacing at least one of the interposing means toward the other from the opposed state to butt end surfaces of the leading end and the trailing end of the filler rubber against each other to join the same.

Thereby, a filler rubber being triangular in cross section can be supplied to the outer peripheral surface of the bead core in an upright posture to be stuck thereto while being wound therearound, and end surfaces of the leading end and the trailing end can be butted against each other to be joined.

In particular, in the method of manufacturing a tire bead, preferably, the first interposing means interposing the neighborhood of the leading end of the filler rubber interposes the leading end of the filler rubber, which is inclined rearward in a direction of rotation due to winding around the outer peripheral surface of the bead core, in a direction conformed to the inclination, displaces the leading end toward the other so as to elongate the same much as it goes toward an outer edge of the filler rubber, from a state of being opposed to the trailing end on an outer edge side with a spacing therebetween, and butting end surfaces of the leading end and the trailing end of the filler rubber against each other. Thereby, no crack is generated on an outer edge side of a joint portion and joining can be made surely without the generation of an excessive overlapping.

Also, it is preferable to stop rotation by the rotary support body when the leading end of the filler rubber reaches a position of an angle of rotation less than a single circumference but equal to or larger than 270° from the reference position, and to have the first interposing means interposing the neighborhood of the leading end of the filler rubber. Thereby, it is possible to stick the whole circumference of the filler rubber and to make joining by butting the end surfaces against each other.

After end surfaces of the leading end and the trailing end of the filler rubber are butted against each other, the pinch rollers are caused to push both sides of a base of the filler rubber toward the trailing end keeping with rotation by the rotary support body to stick the same to the outer peripheral surface of the bead core, and the filler rubber including a joint portion formed by the butting is passed between a pair of interposing pressure rollers to be pinched from both sides to be reshaped. Thereby, the joint portion formed by the butting can be reshaped to a predetermined thickness and joining can be made without the generation of excessive bulging-out of rubber.

The bead core can comprise one formed by wrapping a fiber sheet on an outer periphery of a core body formed by winding a steel wire a plurality of turns.

Further, the invention provides a manufacturing apparatus used in carrying out the method of manufacturing a tire bead, the apparatus comprising a rotary support body that supports a ring-shaped bead core supplied one by one from an inner periphery thereof and can rotate, a feeding device that feeds the filler rubber, which is extrusion-molded to be triangular-shaped in cross section and supplied in a lengthy configuration, tangentially to a reference position, in which sticking to the outer peripheral surface of the bead core supported by the rotary support body begins, in an upright posture, a pair of pinch rollers that push both sides of a base of the filler rubber thus fed against the outer peripheral surface of the bead core in the reference position on the outer peripheral surface of the bead core to stick the same thereto keeping with rotation by the rotary support body, first interposing means that interposes the neighborhood of the leading end of the filler rubber stuck to the outer peripheral surface of the bead core from both sides when the leading end of the filler rubber reaches a position of a predetermined angle of rotation less than a single circumference from the reference position and rotation by the rotary support body is stopped, second interposing means that interposes the neighborhood of the trailing end having a length corresponding to a single circumference of an outer periphery of the bead core, forward in a feeding direction of the feeding device, and a cutting device that cuts the filler rubber to the length corresponding to the single circumference on a side toward the feeding device relative to the second interposing means, and wherein the second interposing means can move the trailing end to a position opposed to the leading end on the outer periphery of the bead core in a state of interposing the neighborhood of the trailing end of the filler rubber thus cut, and one of the first interposing means and the second interposing means can be displaced toward the other from a position of the opposed state and is provided to butt end surfaces of the leading end and the trailing end of the filler rubber against each other owing to the displacing operation to join the same.

With the apparatus, the leading end and the trailing end can be surely butted against each other to be joined while the bead core is rotated in a state of being supported on the rotary support body to hold the lengthy filler rubber, which is triangular-shaped in cross section, in an upright posture to stick the same to the outer peripheral surface of the bead core.

In particular, the first interposing means interposing the neighborhood of the leading end of the filler rubber is provided to interpose the leading end of the filler rubber, which is inclined rearward in a direction of rotation due to winding around the outer peripheral surface of the bead core, in a direction conformed to the inclination and provided to be able to make a turning displacement about a fulcrum shaft in the vicinity of an inner periphery of the bead core to the other side so that the filler rubber is elongated much on an outer edge side thereof. Thereby, joining can be surely accomplished without the generation of crack on an outer edge side of the joint portion.

With the manufacturing apparatus, a sensor is provided to detect when the leading end of the filler rubber reaches a position of a predetermined angle of rotation less than a single circumference from the reference position, and rotation by the rotary support body is stopped on the basis of a detection signal of the leading end by the sensor.

Also, preferably, the first interposing means interposing the neighborhood of the leading end of the filler rubber is provided to be positioned in a position of a predetermined angle of rotation less than a single circumference but equal to or larger than 270° from the reference position and to perform an interposing motion to interpose the neighborhood of the leading end of the filler rubber when rotation by the rotary support body is stopped. Thereby, in a state, in which the filler rubber is wound over an angle of rotation being close to a single circumference but equal to or larger than 270°, it is possible to move the trailing end of the filler rubber thus cut to a position opposed to the leading end to butt the same to join the same and to efficiently perform sticking of the filler rubber.

Preferably, a pair of interposing pressure rollers are provided a little forwardly in the rotational direction of the pinch rollers in the reference position to pressingly interpose the filler rubber including the joint portion from both sides. Thereby, it is possible to reshape the whole filler rubber in a state of being held in an upright posture on the outer peripheral surface of the bead core and to pressingly interpose rubber, which is caused to bulge out by virtue of end surfaces of the leading end and the trailing end being butted against each other, to reshape the same into a predetermined configuration.

Effect of the Invention

As described above, with the method of and the apparatus for manufacturing a tire bead, according to the invention, a filler rubber, which is extrusion-molded to be triangular-shaped in cross section, can be held in an upright posture on an outer peripheral surface of a bead core to be stuck thereto, and end surfaces of a leading end and a trailing end thus cut can be surely butted against each other to be joined. Besides, the bead thus manufactured involves no fear that crack is generated on a joint portion formed by the butting in handling until use in tire molding. Also, thereby, it is possible to improve a tire bead in manufacturing efficiency.

BEST MODE FOR CARRYING OUT THE INVENTION

A mode for carrying out the invention will be described below on the basis of an embodiment shown in the drawings.

FIG. 1 is a schematic, front view showing a bead manufacturing apparatus of the invention, FIG. 2 is a schematic, plan view showing the bead manufacturing apparatus, FIG. 3 is a schematic, front view showing a sticking device about a rotary support body, and FIG. 4 is a longitudinal, cross sectional view showing the rotary support body. FIG. 5 is a front view showing a feeding device of a filler rubber as viewed from laterally of a feeding direction, FIG. 6 is a plan view showing the feeding device, and FIGS. 7 and 8 are cross sectional views taken along the line VII-VII and the line VIII-VIII in FIG. 6, respectively. FIG. 9 is a side view showing a pressing roller, and FIG. 10 is a view illustrating, in enlarged scale, a state, in which the filler rubber is pressed. FIG. 11 is a front view illustrating a state, in which first interposing means and second interposing means are supported, FIG. 12 is a side view showing a portion of the first interposing means, FIG. 13 is a plan view showing the portion of the first interposing means, FIG. 14 is a side view showing a portion of the second interposing means, FIG. 15 is a plan view showing the portion of the second interposing means, and FIG. 16 is a view illustrating a state, in which the filler rubber is butted and joined. FIG. 17 is a side view showing a portion of an interposing pressure roll, and FIG. 18 is a plan view showing the portion of the interposing pressure roll.

In FIGS. 1 and 2, the reference numeral 1 denotes a device that sticks a filler rubber F, in a bead manufacturing apparatus A according to the invention, 2 a supply unit for a ring-shaped bead core C, and 3 a supply unit for the filler rubber F.

The bead core C is laminated and formed by winding a steel wire in a ring-shaped configuration to be made mainly rectangular (hexagonal and octagonal in cross section) in cross section. In some cases, the bead core C comprises a bead core C formed by wrapping a meshy, thin fiber sheet S on a surface of a laminate of a wire W as shown in FIG. 19. The bead cores C are engaged and conveyed one by one from the supply unit 2 by suitable conveyance means 4 and supplied to a rotary support body 10, described later, of the sticking device 1. Accordingly, the conveyance means 4 having the function of receiving the bead cores C one by one from the supply unit 2 and forwarding a single bead core C as received forwardly of the rotary support body to deliver the same to the rotary support body 10.

The filler rubber F is in the form of a band being triangular-shaped in cross section, in particular, longitudinally triangular-shaped in cross section to correspond to a bead being manufactured, and ordinarily extrusion-molded continuously from an extruder 5 provided on the supply unit 3 to be supplied to a portion of a feeding device 20 contiguous to the sticking device 1 through a running guide section 7 provided with a festoon device 6 and a plurality of guide rollers. In particular, the filler rubber F extrusion-molded in a state of falling sidelong is gradually varied in posture in the running guide section 7 to be supplied in a substantially upright posture to a portion of the feeding device 20.

The ring-shaped bead cores C supplied one by one by the conveyance means 4 conforming to a sticking cycle of the filler rubber F are supported from inside by the rotary support body 10 provided on the sticking device 1.

As shown in FIGS. 3 and 4, the rotary support body 10 has the following construction.

The rotary support body 10 comprises mount plates 12 arranged about a hollow rotating shaft 11 and formed by dividing a doughnut-shaped disk into four sections, and arucate support portions 13 mounted along outer peripheries of the respective mount plates 12, and grooves 13a having a U-shaped cross section and having an inner peripheral side of the bead core C fitted thereinto are formed on an outer sides of the support portions 13, so that the inner peripheral side of the bead core C can be supported from inside in a state of being fitted into the grooves 13a.

The respective mount plates 12 are supported so that guide portions 12a provided on back sides thereof engage radially slidably with and do not separate from radial guide members 11b provided on front surfaces of flanged mount plates 11a provided on a forward end of the rotating shaft 11, the respective mount plates being provided to be connected to an operating shaft 14, which is provided axially slidably in an inner hole of the rotating shaft 11, through a link member 15 and to radially expand or contract owing to an advance and retreat action of the operating shaft 14. Thereby, the support portions 13 can suitably engage with and disengage from the bead core C to conform to a change in inside diameter of the bead core C. The reference numeral 16 denotes a cylinder device that advances and retreats the operating shaft 14, 17 a drive motor connected to the rotating shaft 11 through rotation transmitting means 18 such as belt or the like, and the motor 17 is rotationally driven to enable the rotary support body 10.

A support frame 19 rotatably supporting the rotary support body 10 is provided to enable moving up and down relative to a device frame 8 by advance or retreat means such as cylinder device or the like, or lift means such as jack or the like (not shown), and the support frame 19 moves up and down to enable adjusting the height of the rotary support body 10 corresponding to a bead diameter of an object being manufactured. The drive motor 17 is mounted to and supported on the support frame 19 of the rotary support body 10.

As shown in FIGS. 5 to 8, the feeding device 20 for the filler rubber F has the following construction so that a support frame 21 of the device is engaged and supported to be movable relative to a frame 9 arranged in parallel to a feeding direction of the filler rubber F through a linear guide 22 extending in a longitudinal direction (feeding direction) of the frame.

A feed base 23 is provided to enable putting thereon the filler rubber F, which is supplied in an upright posture via the running guide section 7, to forward the same in the feeding direction. The feed base 23 is provided to comprise guide plates 24, 24 provided upright on an upper surface of a plate frame 23a on both sides of a spacing, through which the filler rubber F can pass, and an endless belt 23b arranged between the both guide plates 24, 24 to slide on the plate frame 23a and revolve in the feeding direction, and the belt 23b revolves to enable forwarding the filler rubber F at a constant speed. The feed base 23 is engaged by and connected to the support frame 21 through a linear guide 25 and a rack mechanism 26, which extend in the direction of movement, and supported to be maintained horizontal, the feed base being provided to move together with the support frame 21.

Further, a pair of interposing members 27, 27 are provided to enable interposing the filler rubber F from both sides through cut windows 24a, 24a, which are provided on the guide plates 24, 24 to extend longitudinally. The interposing members 27, 27 are mounted to and supported on a bracket 29 through an air chuck mechanism 28 and provided to be actuated by the air chuck mechanism 28 to perform an interposing motion when it is necessary to cut the filler rubber and to forward a leading end thereof. The bracket 29 is engaged, connected, and supported to be movable relative to the support frame 21 through a linear guide 30.

The reference numeral 31 denotes a cylinder device mounted to the frame 9 and connected to the support frame 21, and the whole of the feeding device 20 on the support frame 21 is caused upon actuation of the cylinder device 31 to advance and retreat in the feeding direction of the filler rubber F. The reference numeral 32 denotes a cylinder device mounted to the support frame 21 and connected to the bracket 29, and the bracket 29 supporting the interposing members 27, 27 are caused upon actuation of the cylinder device 32 to advance toward and retreat from the support frame 21 in the feeding direction.

The reference numeral 33 denotes a drive transmission shaft of the belt 23b, and the drive transmission shaft 33 is connected to a drive motor 37 through a timing belt 36 stretched round timing pulleys 34, 35. Push means 39 is provided to interpose between it and a belt receiver 38 when the support frame 21 and the bracket 29 are to be moved, thereby agreeing timing, in which the support frame 21 and the bracket 29 move, with timing of forwarding of the belt 23b.

The cylinder devices 31, 32 actuate to move the support frame 21 and the bracket 29 whereby a leading end of F1 of the filler rubber F interposed between the both guide plates 24, 24 on the feed base 23 by the interposing members 27, 27 is forwarded to a reference position P1, in which sticking to an outer peripheral surface of the bead core C supported on the rotary support body 10 begins, and to a reference position P1, in the case shown in the figure, set on a topmost portion of the bead core C supported in the manner described above.

That is, setting is such that the support frame 21 is first moved to advance the whole including the feed base 23 and the interposing members 27, 27 and then the bracket 29 is advanced and moved relative to the support frame 21 to advance the interposing members 27, whereby the leading end F1 of the filler rubber F by the interposing members 27, 27 is forwarded to a reference position P1 on an outer periphery of the bead core C on the rotary support body 10. After such forwarding, the interposing motions of the interposing members 27, 27 are released and return to an original position is accomplished.

Provided above a reference position P1 in which sticking to an outer peripheral surface of the bead core C supported on the rotary support body 10 begins, is a pinch roller unit 40 including a pair of vertically movable pinch rollers 40a, 40b, by which both sides of a base of the filler rubber F thus forwarded are pushed against and stuck to the outer peripheral surface of the bead core C in conformity to rotation by the rotary support body 10.

As shown in FIGS. 3 and 9, the pinch rollers 40a, 40b are pivotally supported to be able to turn by mount members 42, 42 such that respective disk-shaped roller plates 41, 41 are spaced to enable entering of the interposing members 27, 27 put in a state of interposing the filler rubber F fore and aft as viewed from the front of the rotary support body 10 and inclined to be decreased in spacing toward a lower end side opposed to the bead core C on the support portions 13 of the rotary support body 10. The mount members 42, 42 are mounted to support members 44, 44, of which spacing can be adjusted by rotation of a screw shaft 43, to be angularly adjustable and supported to enable adjusting the roller plates 41, 41 in angle of inclination and spacing. Thereby, lower ends of the both roller plates 41, 41 can be adjusted in angle of inclination and spacing according to the thickness of the filler rubber F and the width of the bead core C, so that both sides of the base of the filler rubber F can be pushed against and pressed to the bead core C as shown in FIG. 10. The reference numeral 46 denotes a linear guide that supports the support members 44, 44 to make the same slidable relative to a support bracket 45 for lifting.

The support bracket 45 is supported on the longitudinal device frame 8 through a linear guide 47 to able to go up and down, and a cylinder device 48 for lifting is connected to an upper portion of the support bracket 45, so that the cylinder device 48 is actuated to have the support bracket 45 going up and down whereby the pinch rollers 40a, 40b go up and down between a position of pressing the both sides of the base of the filler rubber F and a position of retreating above a position, to which the filler rubber F is forwarded. Thereby, it is possible to retreat the pinch rollers 40a, 40b upward as indicated by chain lines when the bead core C is to be set and when a bead completed after the filler rubber F is stuck thereto is to be taken out.

In order that the leading end F1 and the cut trailing end F2 of the filler rubber F be butted oppositely against each other to be joined, first interposing means 50 that interposes the neighborhood of the leading end of the filler rubber F stuck to the outer peripheral surface of the bead core C and second interposing means 70 that interposes the neighborhood of the trailing end of the filler rubber F being cut to a predetermined length corresponding to a single circumference of the outer periphery of the bead core are provided around the rotary support body 10 as shown in FIG. 11. The second interposing means 70 is constructed to enable the cut trailing end F2 of the filler rubber F to a position (position indicated by chain lines in FIG. 11) opposed to the leading end F1 on the outer periphery of the bead core. Also, one of the both interposing means, for example, the first interposing means 50 is constructed to be able to be displaced toward the second interposing means 70 opposed thereto (chain lines in FIG. 11).

The first interposing means 50 and the second interposing means 70, respectively, are constructed to make an interposing motion when rotation by the rotary support body 10 is stopped. Therefore, a sensor 51 is provided in the vicinity of the first interposing means 50 to detect the leading end F1 of the filler rubber F reaches a position of the predetermined angle of rotation from the reference position P1, and rotation of the rotary support body 10 caused by the drive motor 17 is stopped on the basis of a detection signal of the leading end F1 by the sensor 51. The first interposing means 50 and the second interposing means 70, respectively, are constructed to make an interposing motion simultaneously with the stoppage of rotation. Further, the second interposing means 70 is controlled to move the trailing end F2 to a position opposed to the leading end F1 on the bead core C after a cutting device 80 described later cuts the trailing end F2 in the interposed state, and the first interposing means 50 is controlled to move toward the second interposing means 70 after the movement of the second interposing means 70 after the neighborhood of the leading end F1 is interposed.

The first interposing means 50 is provided to be positioned in a position of a predetermined angle of rotation less than a single circumference from the reference position P1 in a direction, in which the rotary support body 10 rotates for winding of a filler rubber, preferably, a position of an angle of rotation exceeding 270° but less than a single circumference from the reference position P1, in particular, preferably, in a position of an angle of rotation in the range of 270° to 315° and to interpose the neighborhood of the leading end F1 with some length (preferably, around 5 to 15 mm) of the leading end F1 of the filler rubber F left in a protrusive manner from both sides.

With the embodiment as shown, the first interposing means 50 includes a pair of interposing members 50a, 50b, which can open and close, and is constructed in the following manner.

A base plate 53 journaled by a journal shaft 52 on the device frame 8 is provided rearwardly of a position, in which the bead core C is supported by the rotary support body 10. A swing arm 55 is mounted to a fulcrum shaft 54 set on the base plate 53 in a position in the vicinity inside the bead core C to be able to turn and one of the pair of interposing members 50a, 50b, for example, the interposing member 50a is mounted to a mount plate 56 projecting forwardly of the swing arm 55 to be parallel to the filler rubber F stuck to the bead core C in an upright posture. The other 50b of the interposing members is pivotally connected to the one 50a of the interposing members to be able to turn, a rack 59 advanced and retreated by a cylinder device 58 meshes with a pinion 57 provided integral with the interposing member 50b, and the rack 59 advances or retreats whereby the interposing member 50b turns in a direction, in which it opens or closes relative to the one 50a of the interposing members, to interpose the filler rubber F between it and the one 50a of the interposing members. The other 50b of the interposing members is held outside the filler rubber F except at the time of interposing motion to enable the work of setting the bead core C on the rotary support body 10 and taking out the bead. The reference numeral 60 in the figure denotes a guide roller that feeds the filler rubber F into between the both interposing members 50a, 50b.

The interposing members 50a, 50b are provided as shown in the figure to be inclined to the outer peripheral surface of the bead core C rearward in the direction of rotation as they go outward, taking into consideration inclination of the leading end F1 of the filler rubber F wound round the outer peripheral surface of the bead core C. That is, as the rotary support body 10 rotates, an outer edge side of the filler rubber F being wound round the outer peripheral surface of the bead core C is pulled rearward in the direction of rotation as it goes toward an outer edge, so that the leading end F1 is put in a state of being inclined to the core outer peripheral surface rearward in the direction of rotation. Therefore, taking into consideration inclination of the leading end F1 of the filler rubber F, the interposing members 50a, 50b are provided to enable interposing the filler rubber F in a direction corresponding to inclination thereof.

As means for displacement toward the second interposing means 70 having been moved to a position opposed to the first interposing means 50 in a state, in which the neighborhood of the leading end F1 of the filler rubber F is interposed, a cylinder device 61 is connected to the swing arm 55 supporting the interposing members 50a, 50b and the cylinder device 61 is actuated to turn the swing arm 55 about the fulcrum shaft 54 whereby the interposing members 50a, 50b are turned about the fulcrum shaft 54 to be displaced. Thereby, the leading end F1 of the filler rubber F is elongated much as it goes toward an outer edge thereof, from a state of being inclined to the outer peripheral surface of the bead core C rearward in the direction of rotation, and can be put in a state of being made substantially perpendicular to the core outer peripheral surface in a position, in which it is butted against the trailing end F2 described later, as indicated by chain lines in FIG. 11 and as shown in FIG. 16.

In addition, the base plate 53 is supported to be enabled by actuation of a cylinder device 62 connected to a lower end thereof to turn about the journal shaft 52 and provided to thereby enable adjusting a position, in which the base plate 53 is supported, and hence a position of the first interposing means 50 on the base plate 53, a position of the fulcrum shaft 54 of the swing arm 55, a position of the sensor 51, etc. according to a size (diameter) of the bead core C supported on the rotary support body 10.

Also, the second interposing means 70 is provided to interpose the neighborhood of the trailing end F2 from both sides, which is cut to a predetermined length corresponding to a single circumference of the outer periphery of the bead core, in a position forwardly of the feeding device 20 in a forwarding direction and on this side of the reference position P1 with some length (preferably, around 5 to 15 mm) of the trailing end F2 of the filler rubber F left in a protrusive manner. That is, when cut by the cutting device 80 described later, the trailing end F2 is interposed such that some length thereof projects.

The second interposing means 70 comprises a pair of interposing members 70a, 70b and one 70a of the interposing members is arranged vertically along a side of the filler rubber F forwarded to the reference position P1 from the feeding device 20 in the manner described above. The other 70b of the interposing members is pivotally connected to the one 70a of the interposing members above the filler rubber F as forwarded to be able to turn, a rack 73 advanced and retreated by a cylinder device 72 meshes with a pinion 71 provided integral with the interposing member 70b, and the rack 73 advances or retreats whereby the interposing member 70b turns in a direction, in which it opens or closes relative to the one 70a of the interposing members, to interpose the filler rubber F between it and the one 70a of the interposing members.

Also, the one 70a of the interposing members is connected to and supported on the journal shaft 52 through an arm member 74, and provided to turn about the journal shaft 52 in a state, in which the both interposing member 70a, 70b interpose the trailing end F2, to thereby move to a position opposed to the leading end F1 stuck to the bead core C on the rotary support body 10 (chain lines in FIG. 11). For such movement, the journal shaft 52 supporting the arm member 74 is connected at a radial projection thereof to a cylinder device 75 rearwardly of the base plate 53 and as the cylinder device 75 is actuated to rotate the journal shaft 52, the arm member 74 turns to move the both interposing members 70a, 70b to the opposed position on the bead core C from a position, in which the interposing members make an interposing motion.

Further, the cutting device 80 is provided above a side toward the feeding device 20 relative to a position, in which the interposing members 70a, 70b make an interposing motion, to cut the filler rubber F as forwarded. A cutter blade 81 of the cutting device 80 is normally held above the filler rubber F as forwarded not to get in the way of forwarding of the filler rubber F by the feeding device 20, and after the second interposing means 70 makes an interposing motion, the cutter blade 81 descends owing to actuation of a cylinder device or the like whereby the filler rubber F is cut. A position, in which the cutting device 80 makes a cut, is set so that a length to the cut position from the reference position P1, in which sticking to the bead core C supported on the rotary support body begins, corresponds substantially to a distance to the reference position P1 on the outer periphery of the bead core C from the leading end F1 of the filler rubber F interposed by the first interposing means 50, or a distance to the reference position from a position, in which the leading end and the trailing end are butted against each other on the outer periphery of the bead core.

Also, as shown in FIGS. 3, 17 and 18, an interposing pressure roller unit 90 including a pair of interposing pressure rollers 90a, 90b that pressingly interpose and reshape the filler rubber F stuck to the outer peripheral surface of the bead core C from both sides is provided a little forwardly of the pinch rollers 40a, 40b in the direction of rotation. One of the interposing pressure rollers 90a, 90b, that is, the interposing pressure roller 90a positioned on a back side of the filler rubber F as viewed from the front of the apparatus (the front of the rotary support body) is supported by a support shaft 92, which is mounted to a bracket 91 mounted to the device frame 8 along a side on the back side of the filler rubber F, in a direction perpendicular to the outer peripheral surface of the bead core to be able to rotate. With the embodiment as shown, a roller body 93 of the interposing pressure roller 90a is provided on the support shaft 92 with an eccentric cam roller 94 therebetween and supported to be able to approach or separate from the side of the filler rubber F upon rotation of the cam roller 94, the roller body being disposed separate from the filler rubber F except at the time of action of interposing pressure (FIG. 18). The reference numeral 95 denotes a cylinder device connected to the cam roller 94, and the cam roller 94 is rotated by actuation of the cylinder device 95.

Also, a shaft portion 97 of the other 90b of the interposing pressure rollers is mounted to an arm 96, which is pivotally supported by the bracket 91 to be able to turn, the arm 96 is provided to be able to open or close relative to the one 90a of the interposing pressure rollers upon actuation of a cylinder device 98 connected thereto, when the filler rubber is to be stuck, the interposing pressure roller 90b is positioned in a position in opposed contact with the side of the filler rubber F (a state indicated by solid lines in FIG. 17), and when the bead core is to be set and when a bead completed after the filler rubber F is stuck thereto is to be taken out, the interposing pressure roller can be put in a state indicated by chain lines in FIG. 17.

In addition, guide rollers are arranged at need at suitable intervals around the rotary support body 10 to inhibit fall of the filler rubber F stuck to the bead core C in an upright posture (not shown).

An explanation will be given to a method of sticking a filler rubber to a bead core to manufacture a tire bead with the use of the apparatus.

As shown in FIGS. 1 and 2, a filler rubber F, which is extrusion-molded from the extruder 5 to be triangular-shaped in cross section, is fed to a portion of the feeding device 20 contiguous to the sticking device 1 while passing through the air-cooled festoon device 6 to be gradually put in an upright posture. On the other hand, a ring-shaped bead core C is fed forwardly of the sticking device 1 from the bead core supply unit 2 by the conveyance means 4, which can hold the bead core C in a latched state to convey the same, and fed to the rotary support body 10 of the sticking device 1 from the conveyance means 4 to be engaged from inside and supported by the support portions 13 provided on the rotary support body 10.

In this state, as shown in FIG. 20A, the filler rubber F fed to the feeding device 20 to be interposed by the guide plates 24, 24 on both sides thereof is interposed by the interposing members 27, 27 on the portions of the cut windows 24a of the guide plates 24, 24 to stand by. In this state, the cylinder device 31 is actuated to advance the support frame 21 of the feeding device 20 toward the reference position P1, in which sticking to the bead core C supported on the rotary support body begins. Such advance causes the guide plates 24 and the interposing members 27, 27 to approach the reference position P1 and the bracket 29 supporting the interposing members 27, 27 is advanced, whereby the leading end F1 of the filler rubber F in an upright posture is forwarded to the reference position P1 on a top of the outer peripheral surface of the bead core C supported on the rotary support body 10 (FIG. 20B) and the interposing action of the interposing members 27 is released simultaneously with such forwarding.

At this time, the pinch roller unit 40 including the pair of pinch rollers 40a, 40b descends to be positioned in the reference position P1, that is, a pinch position, in which it abuts on the bead core C, so that simultaneously when the leading end F1 of the filler rubber F is forwarded, the pinch rollers 40a, 40b cause both sides of the base thereof to come into pressure contact with and stick to the bead core C. In addition, at this time, the cutting device 80 and the second interposing means 70 that interposes the neighborhood of the trailing end F2 being cut retreat to upper or rearward positions, in which they do not obstruct advancing of the feeding device 20 and forwarding of the filler rubber F.

As described above, as the rotary support body 10 rotates, both sides of the base are caused by the pinch rollers 40a, 40b to come into pressure contact with and stick to the bead core C while held in an upright posture to be wound around the outer peripheral surface of the bead core C supported on the outer periphery of the rotary support body 10 (FIG. 20C). During such sticking, the feeding device 20 and the interposing members 27 return to original positions.

When the leading end F1 of the filler rubber F reaches a position of the predetermined angle of rotation, the sensor 51 detects this matter and rotation of the leading end F1 is stopped in a position slightly forwardly of a position, in which the leading end F1 is interposed by the first interposing means 50. Simultaneously with this, the cylinder device 59 of the first interposing means 50 actuates to perform an interposing action and the both interposing members 50a, 50b interpose the neighborhood of the leading end F1 from both sides (FIG. 20D). In particular, the first interposing means 50 interposes the leading end F1, which is inclined to the outer peripheral surface of the core rearward in the direction of rotation, in a direction corresponding to inclination thereof.

Also, on a side forwarded to the reference position P1 from the feeding device 20, the feeding device 20 and the interposing members 27, 27, respectively, having been positioned in advanced positions return to original positions. In this state, the second interposing means 70 is moved to a position close to the filler rubber F and actuated by the cylinder device 72 perform an interposing action, and so the interposing members 70a, 70b interpose the neighborhood of a portion, which makes the trailing end F2 formed by cutting the filler rubber F. At the same time, the interposing members 27, 27 on the feeding device 20 are operated again to interpose the filler rubber F between the both guide plates 24, 24.

When the interposing action is completed, the cutter blade 81 of the cutting device 80 descends to cut the filler rubber F, which is interposed by the second interposing means 70, in a location of a length corresponding to a single circumference of the outer periphery of the core from the leading end F1 (FIG. 20E). When the cutting action is completed, the second interposing means 70 in a state of interposing the neighborhood of the trailing end F2 of the filler rubber F being cut is caused by turning of the arm member 74 by actuation of the cylinder device 75 to move to a position opposed to the leading end F1 on the bead core C from the interposing position. At this time, the trailing end F2 is moved to be made substantially perpendicular to the core outer peripheral surface in a manner to elongate an outer edge side of the filler rubber F.

Thereby, the leading end F1 and the trailing end F2 of the filler rubber F are opposed to each other in a state of projecting a little from the first interposing means 50 and the second interposing means 70 on the outer periphery of the bead core C (chain lines in FIG. 20E). In this state, the cylinder device 61 is actuated to turn the swing arm 55 to turn and displace the first interposing means 50 toward the second interposing means 70, in keeping with which, the filler rubber F is elongated much as it goes toward an outer edge thereof and the leading end F1 is put in a state of being made substantially perpendicular to the outer periphery of the bead core C from a state of being inclined to the outer peripheral surface of the bead core C rearward in the direction of rotation, and thus butted against the trailing end F2 interposed by the second interposing means 70, with the result that the leading end F1 and the trailing end F2 are joined (FIG. 20F).

Thereafter, when the first interposing means 50 and the second interposing means 70 release the interposing action and return to the original positions, the rotary support body 10 again rotates to cause the pinch rollers 40a, 40b to push both sides of the base of the filler rubber F toward the trailing end F2 to stick the same to the outer peripheral surface of the bead core C and the filler rubber F including a joint portion J formed by the butting is passed between the pair of interposing pressure rollers 90a, 90b to be pinched from both sides to be reshaped. Thereby, the joint portion J formed by the butting can be reshaped to a predetermined thickness.

Thereafter, when the pinch rollers 40a, 40b ascend from a position, in which the filler rubber F is pinched, and interposing pressure by the interposing pressure rollers 90a, 90b is released (FIG. 20G), the support member 13 of the rotary support body 10 is decreased in diameter, so that a bead B, shown in FIG. 21, with the filler rubber F stuck to the bead core C is taken out from the rotary support body 10.

In this manner, the leading end F1 and the trailing end F2 can be butted against each other to be surely joined without an excessive overlapping and shortage of rubber, while the filler rubber F in an upright posture is forwarded to the outer peripheral surface of the bead core C to be wound therearound and stuck thereto as it is in an upright posture, a bead B with the filler rubber F stuck to the bead core C can be efficiently manufactured, and manufacture of a bead can be automated.

Also, no excessive overlapping and no shortage of rubber are generated on a joint portion formed by butting, so that it is possible to obtain a bead, which involves no fear of crack in a joint portion, rubber does not bulge out, and is good in weight balance.

INDUSTRIAL APPLICABILITY

A method of and an apparatus for manufacturing a tire bead, according to the invention, can be preferably made use of in sticking a filler rubber, which is extrusion-molded to be triangular-shaped in cross section, to an outer peripheral surface of a bead core, around which wire is wound in a ring-shaped configuration and which is subjected to laminate molding to be made rectangular in cross section, in a state of being held in an upright posture to the outer peripheral surface to manufacture a bead.

DESCRIPTION OF REFERENCE NUMERALS AND SIGNS

Figure 1:
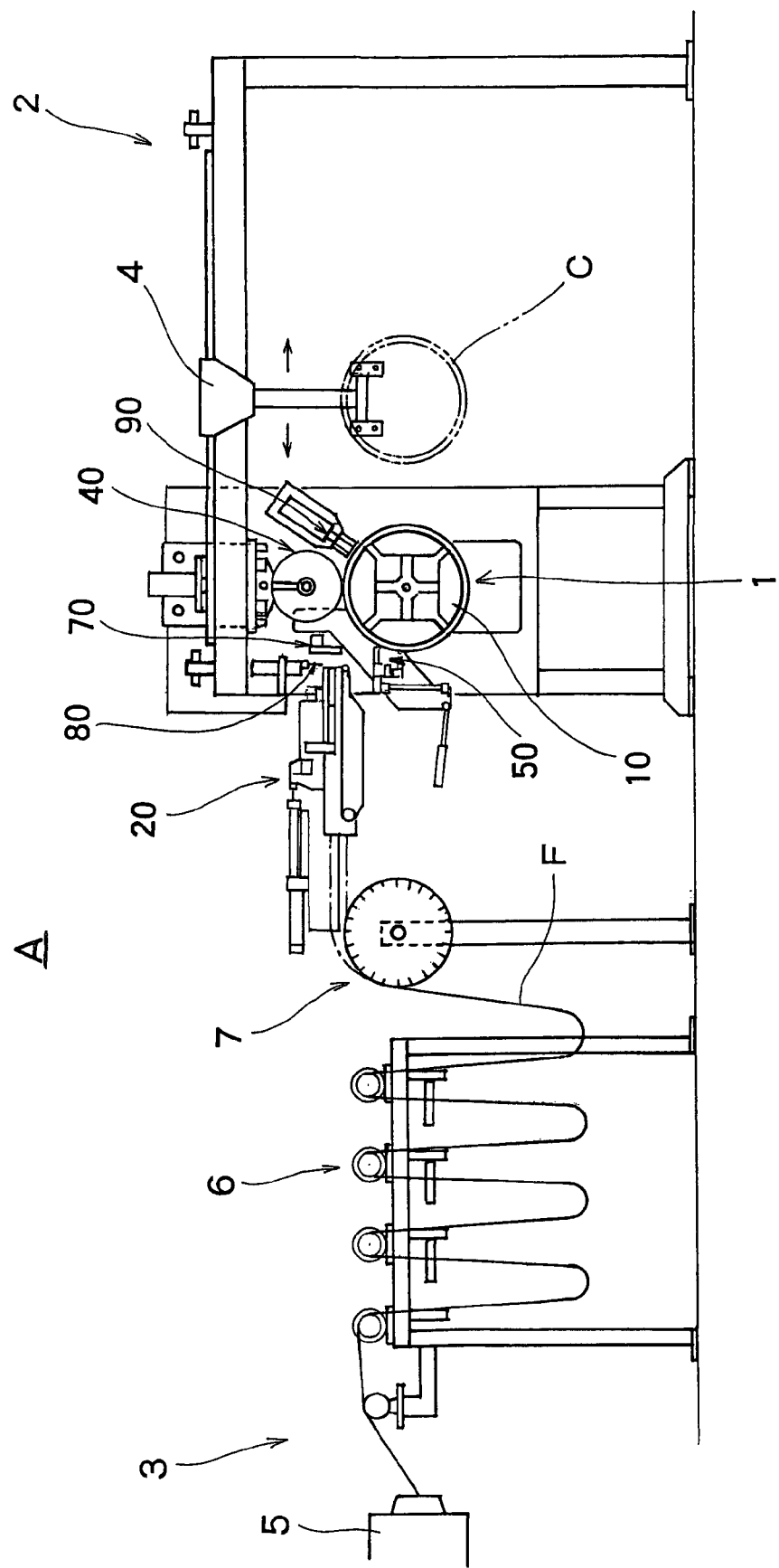
FIG. 1 is a schematic, front view showing a bead manufacturing apparatus of the invention.
Figure 2:
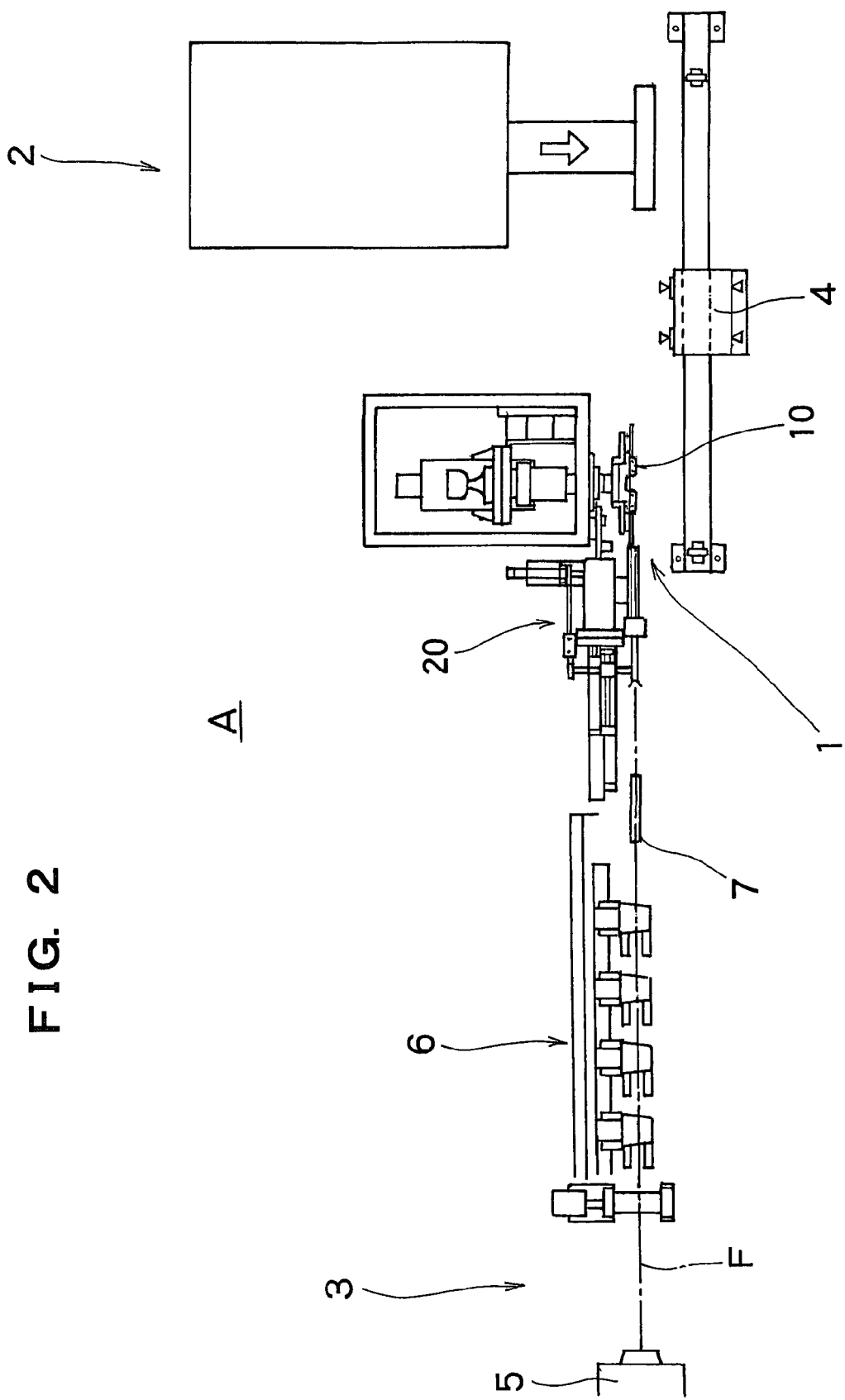
FIG. 2 is a schematic, plan view showing the bead manufacturing apparatus.
Figure 3:
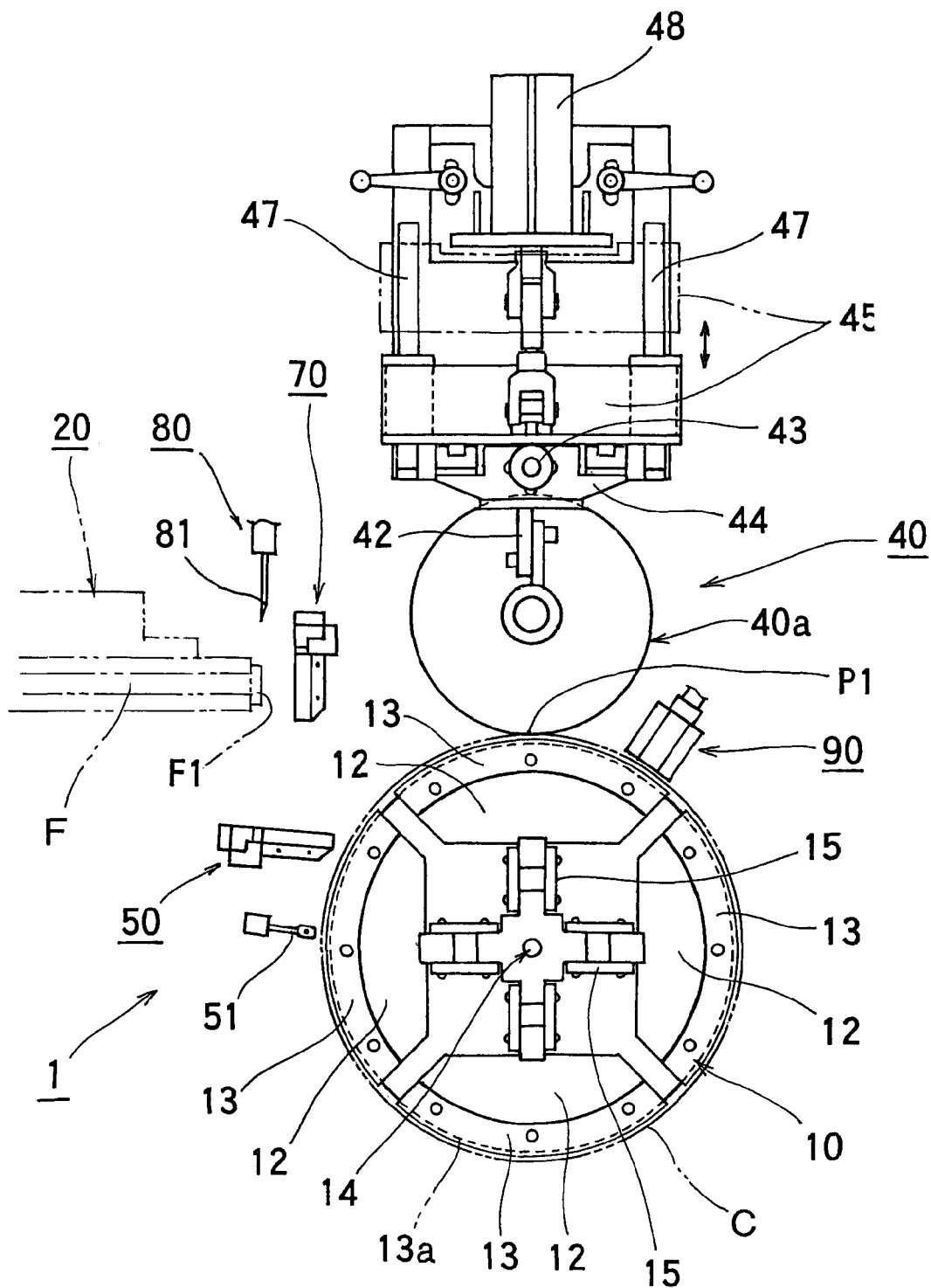
FIG. 3 is a schematic, front view showing a sticking device about a rotary support body.
Figure 4:
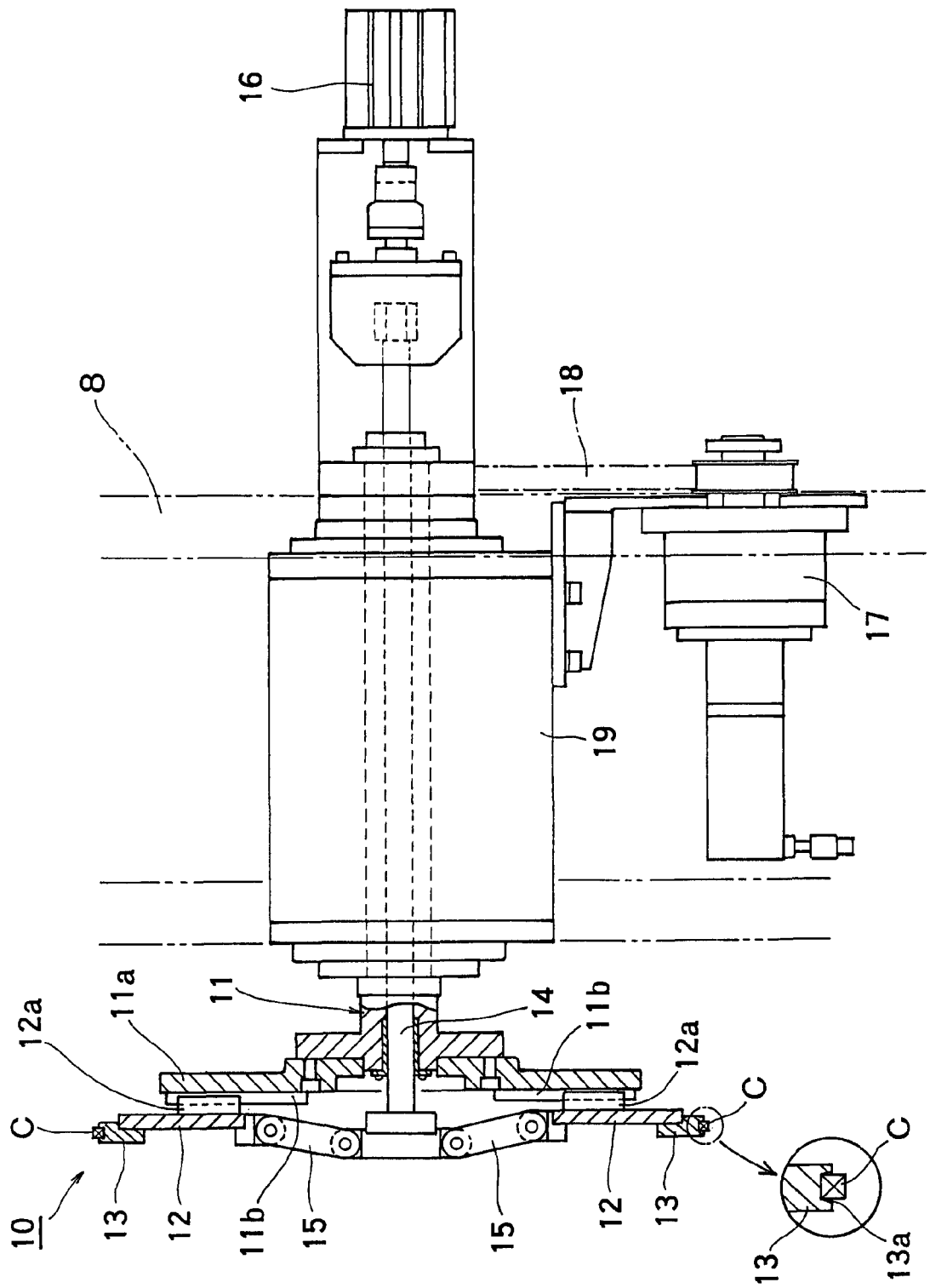
FIG. 4 is a longitudinal, cross sectional view showing the rotary support body.
Figure 5:
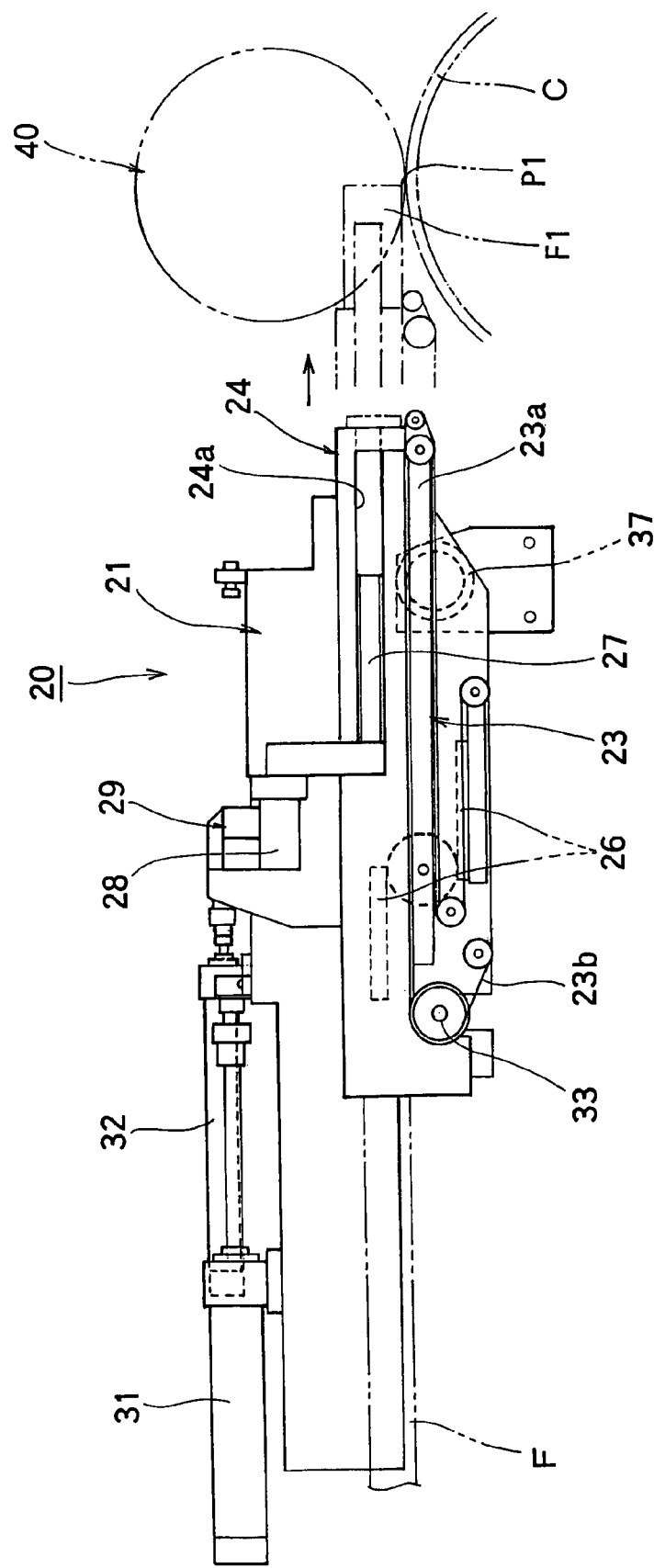
FIG. 5 is a front view showing a feeding device of a filler rubber as viewed from laterally of a feeding direction.
Figure 6:
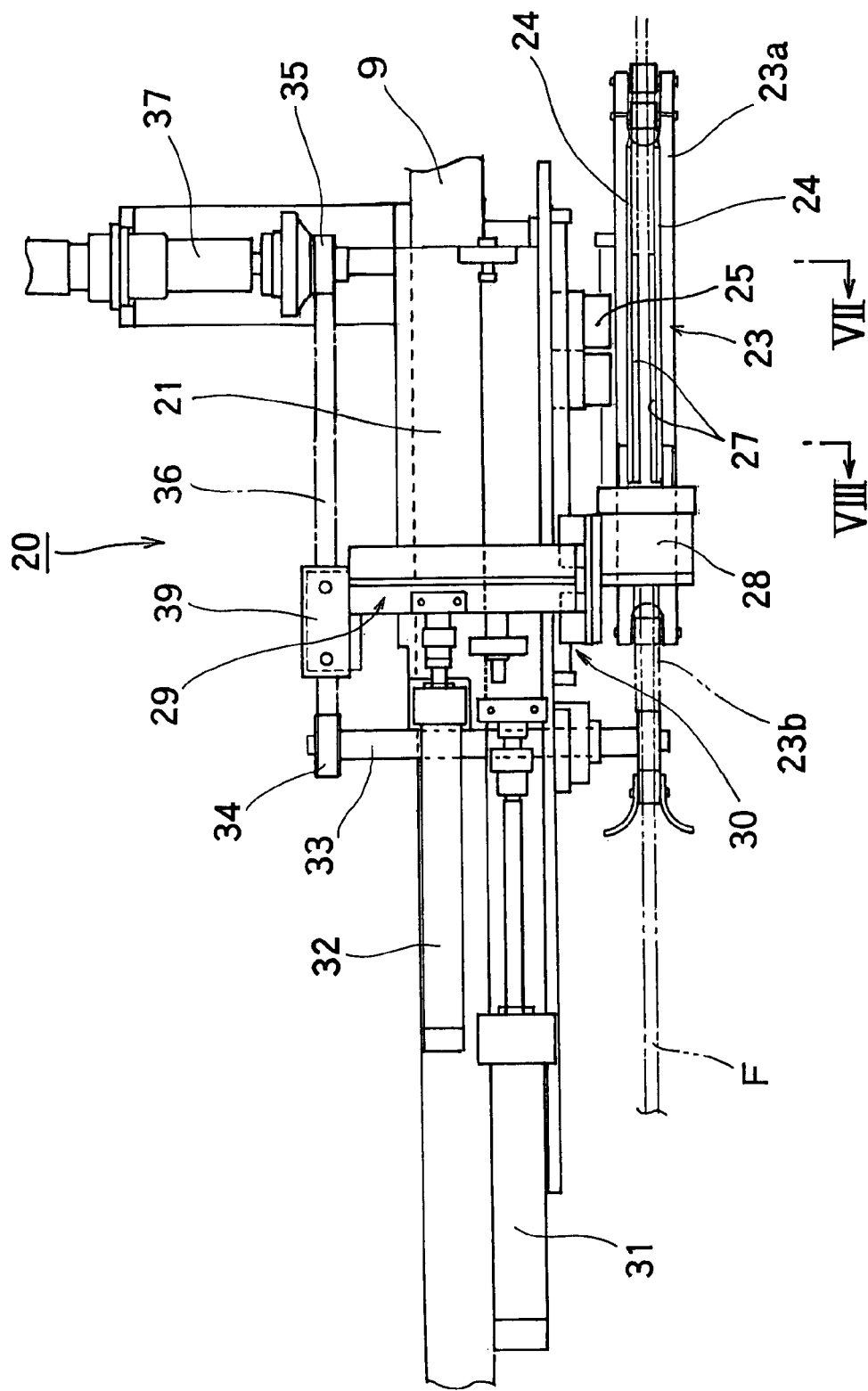
FIG. 6 is a plan view showing the feeding device.
Figure 7:
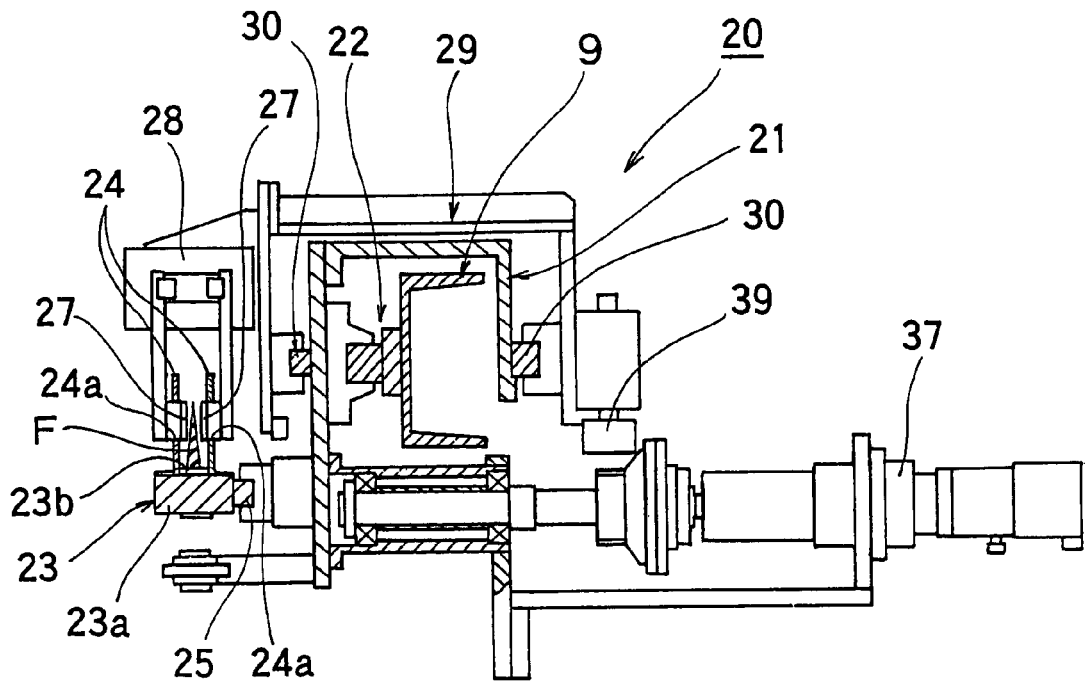
FIG. 7 is a cross sectional view taken along the line VII-VII in FIG. 6.
Figure 8:
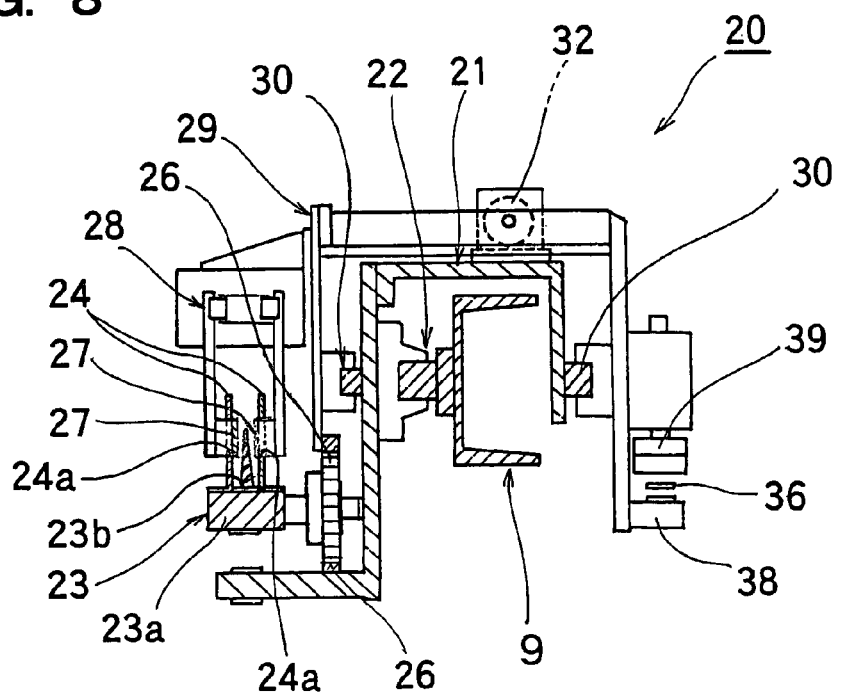
FIG. 8 is a cross sectional view taken along the line VIII-VIII in FIG. 6.
Figure 9:
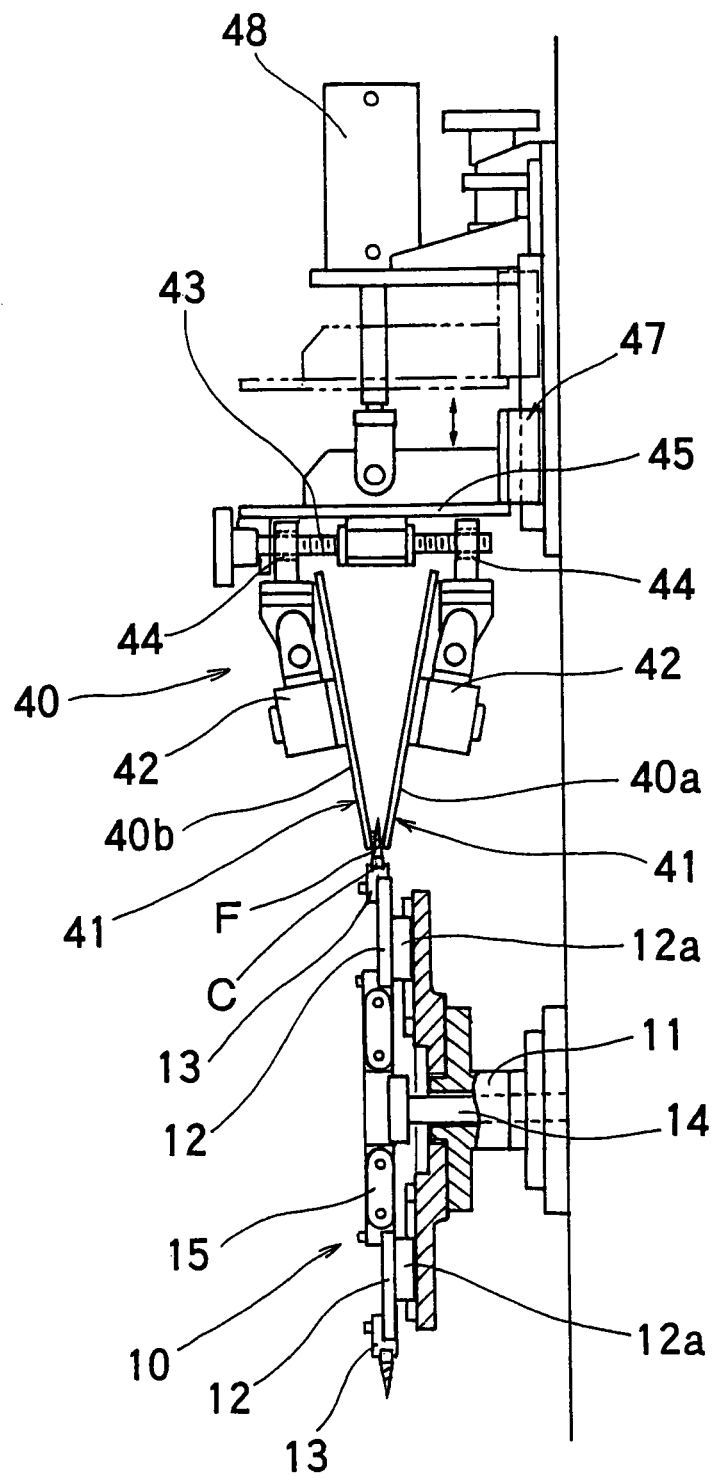
FIG. 9 is a side view showing a pressing roller.
Figure 10:
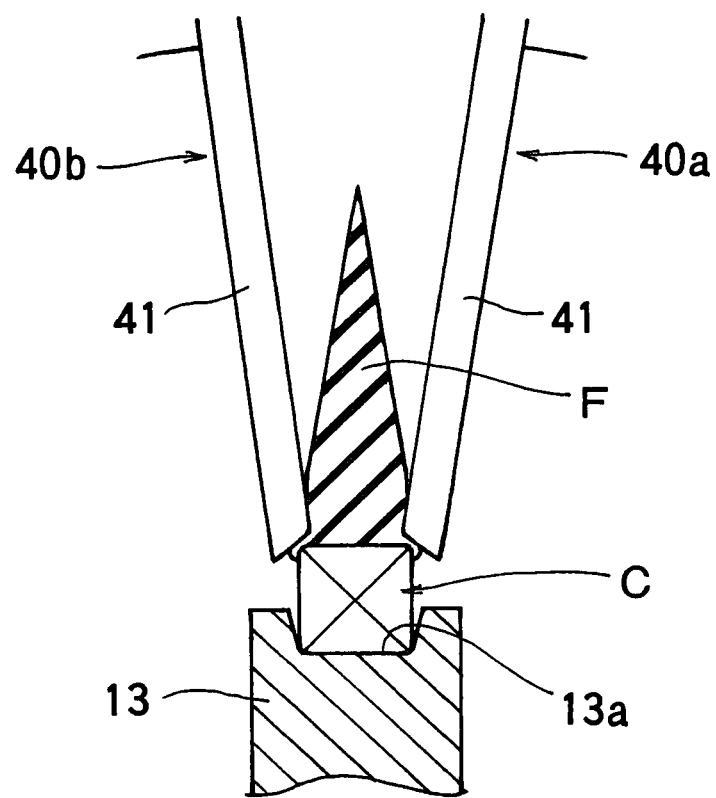
FIG. 10 is a view illustrating, in partly enlarged scale, a state, in which the filler rubber is pressed.
Figure 11:
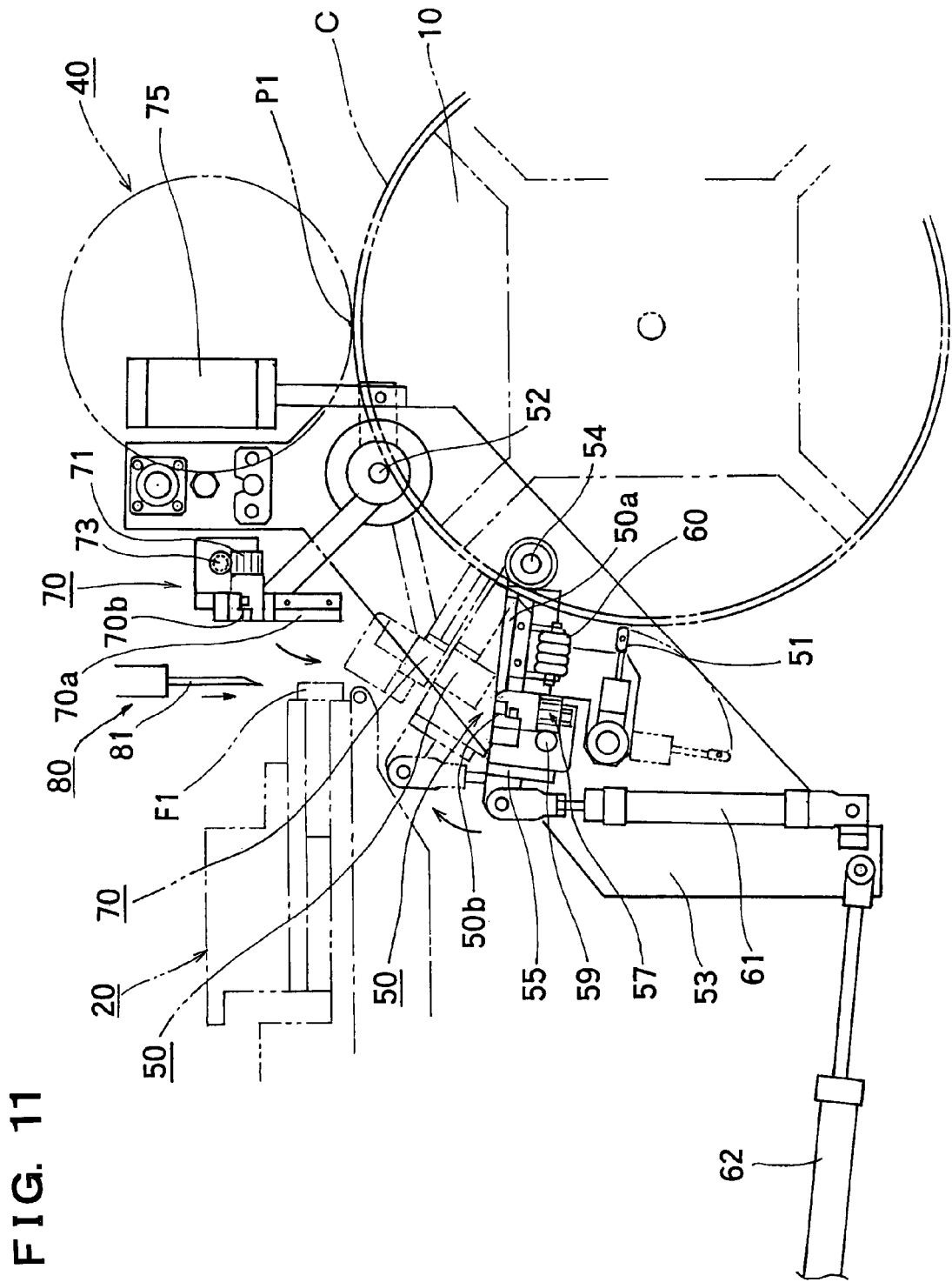
FIG. 11 is a front view illustrating a state, in which first interposing means and second interposing means are supported.
Figure 12:
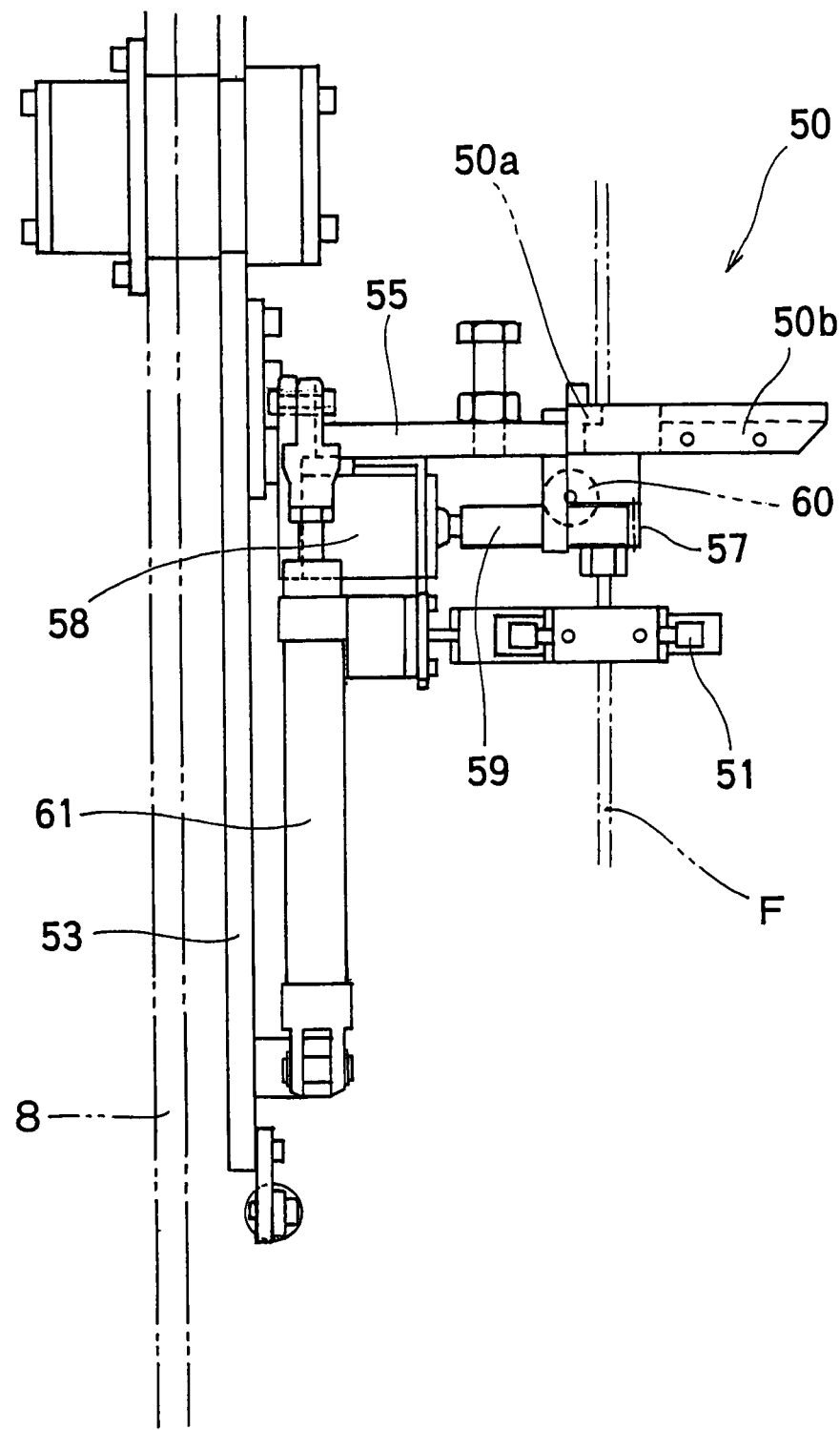
FIG. 12 is a side view showing a portion of the first interposing means.
Figure 13:
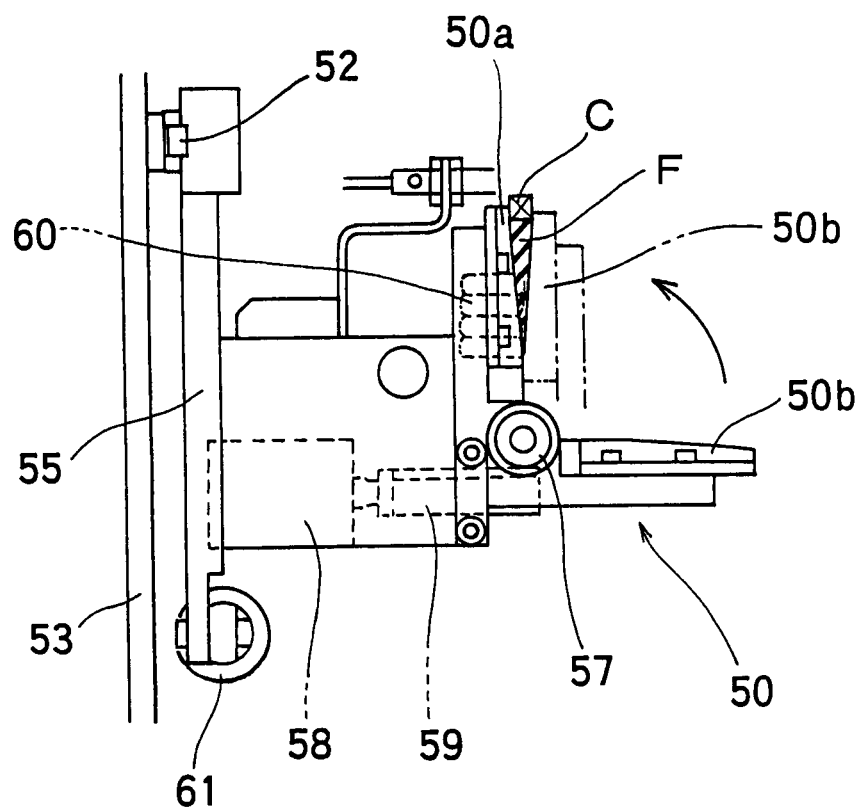
FIG. 13 is a plan view showing the portion of the first interposing means.
Figure 14:
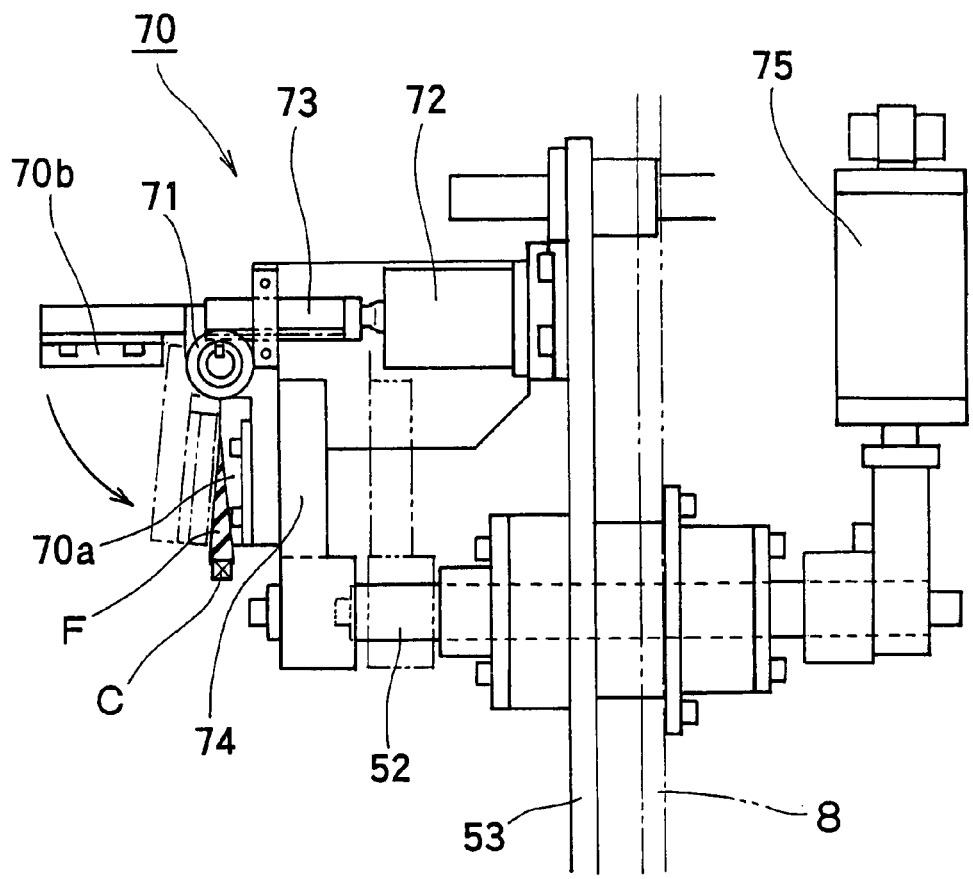
FIG. 14 is a side view showing a portion of the second interposing means.
Figure 15:
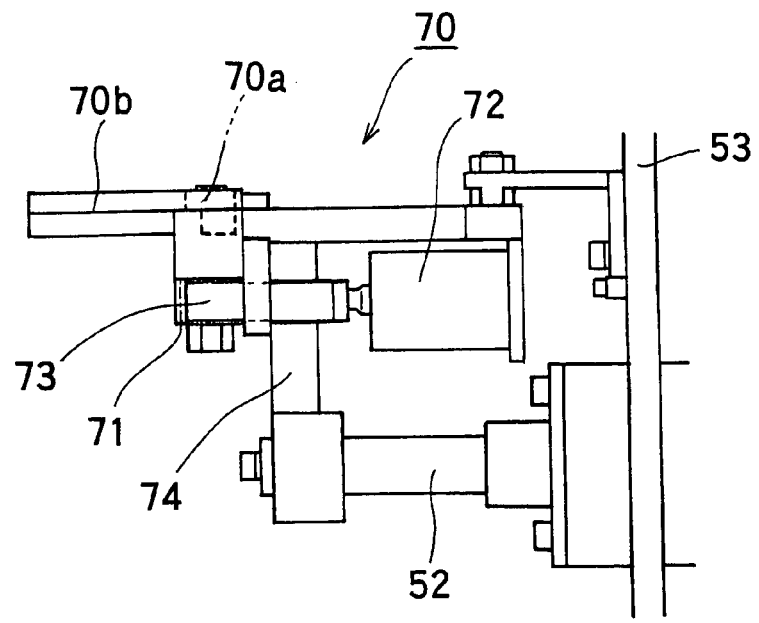
FIG. 15 is a plan view showing the portion of the second interposing means.
Figure 16:
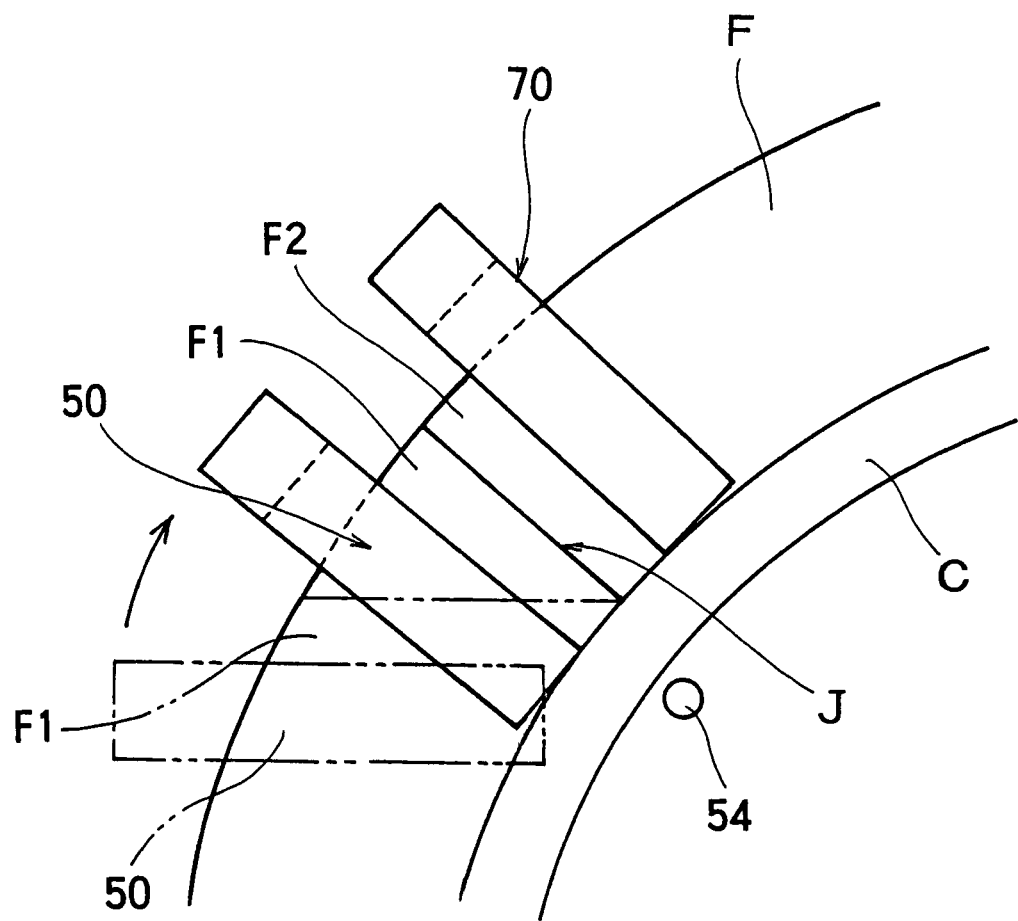
FIG. 16 is a illustrating a state, in which the filler rubber is butted and joined.
Figure 17:
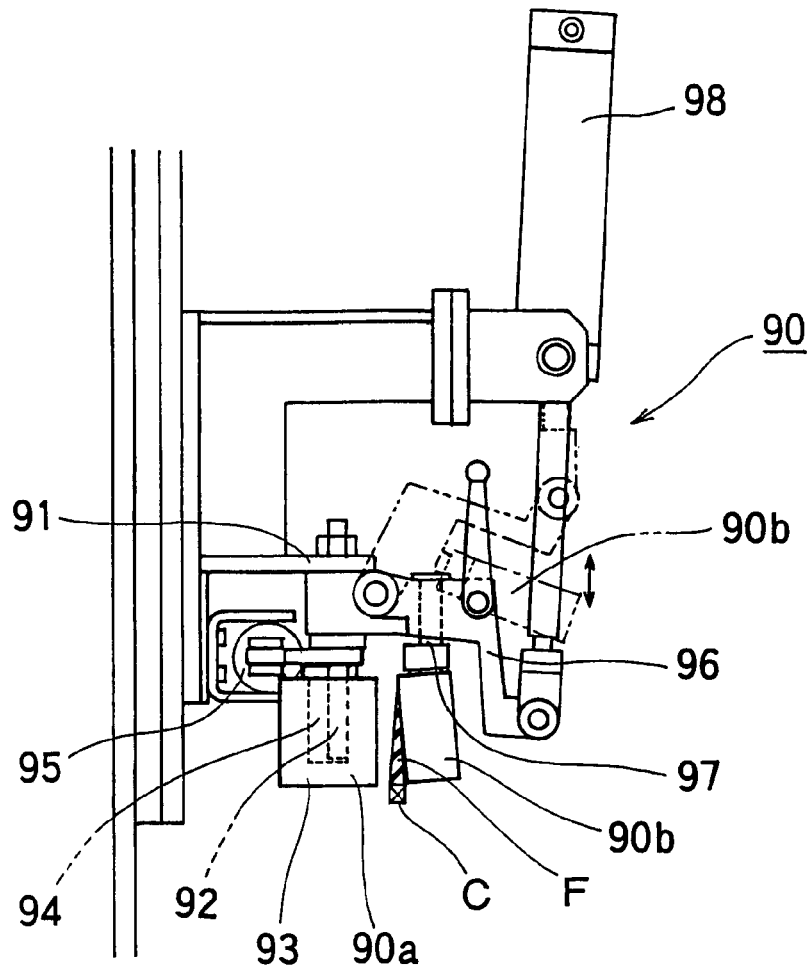
FIG. 17 is a side view showing a portion of an interposing pressure roll.
Figure 18:
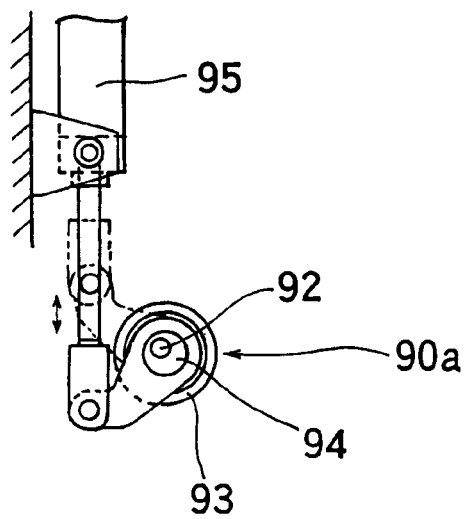
FIG. 18 is a plan view showing the portion of the interposing pressure roll.
Figure 19:
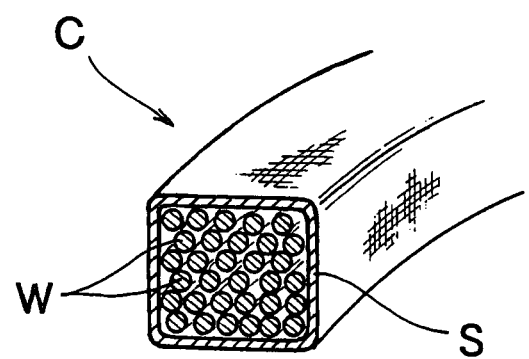
FIG. 19 is a cross sectional view showing an example of a bead core.
Figure 20A:
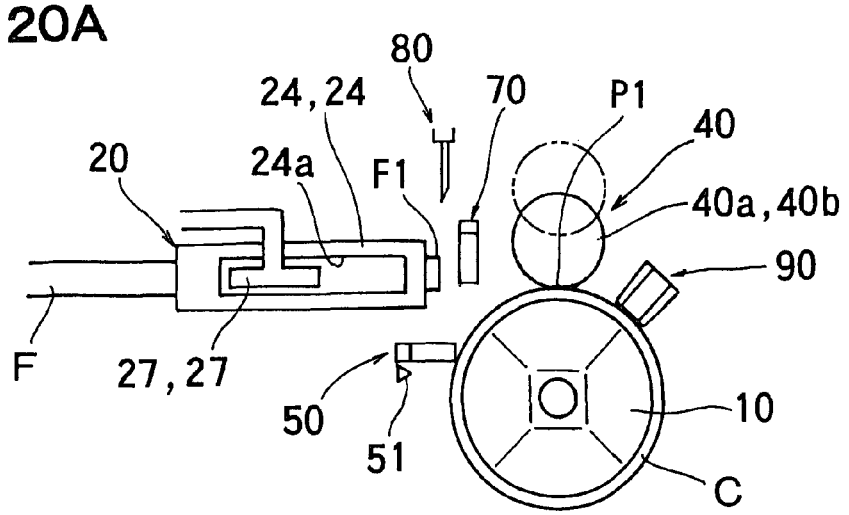
FIG. 20A is a view illustrating a state, in which the filler rubber is stuck to the bead core.
Figure 20B:
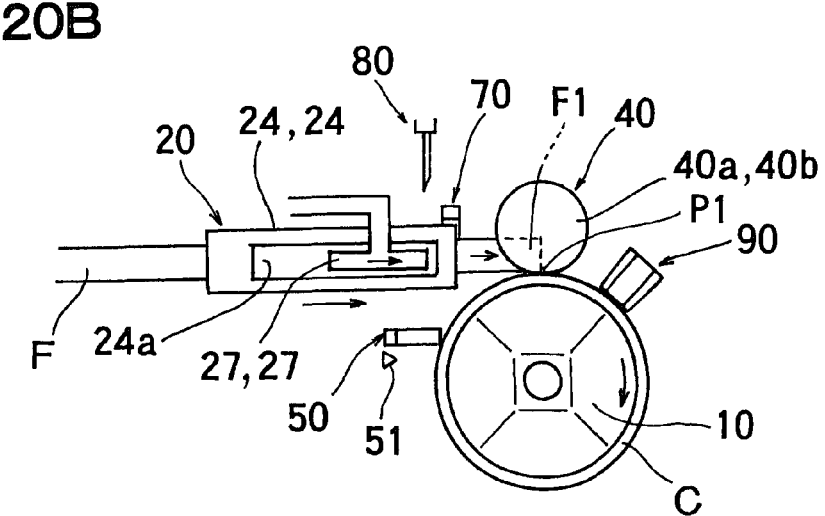
FIG. 20B is a view illustrating a state, in which the filler rubber is stuck to the bead core.
Figure 20C:
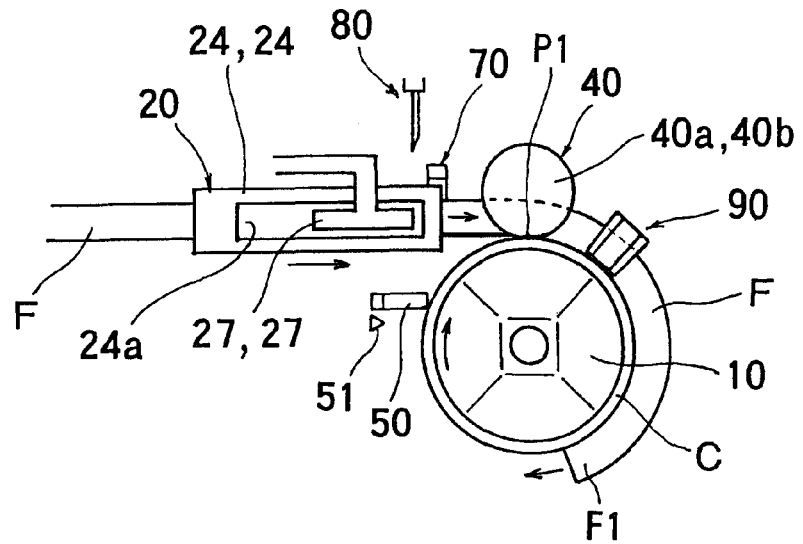
FIG. 20C is a view illustrating a state, in which the filler rubber is stuck to the bead core.
Figure 20D:
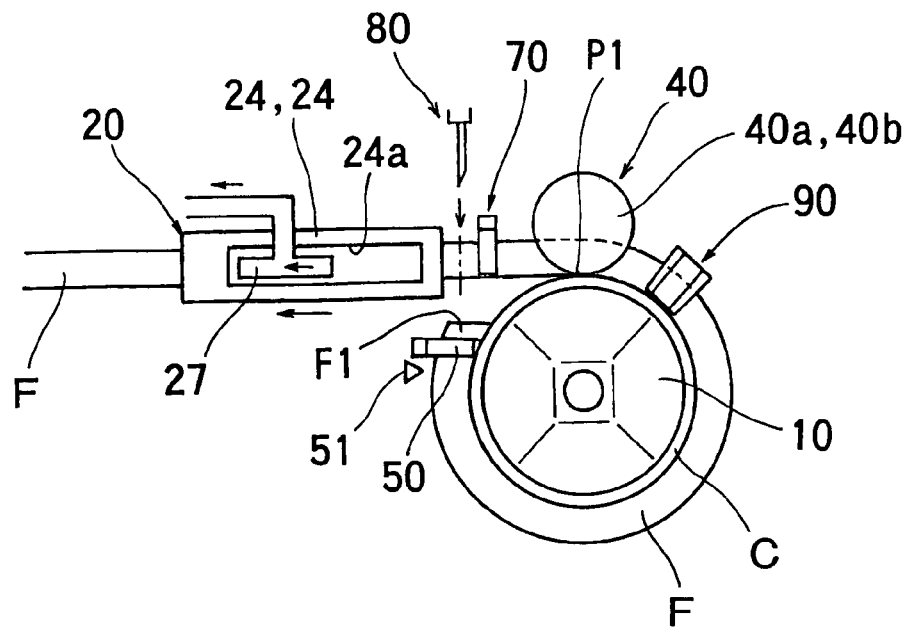
FIG. 20D is a view illustrating a state, in which the filler rubber is stuck to the bead core.
Figure 20E:
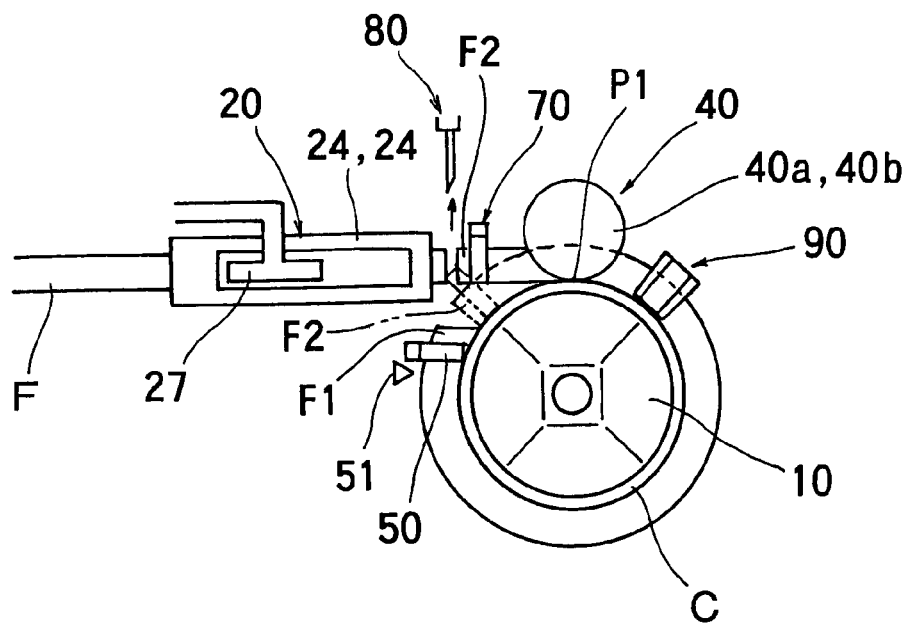
FIG. 20E is a view illustrating a state, in which the filler rubber is stuck to the bead core.
Figure 20F:
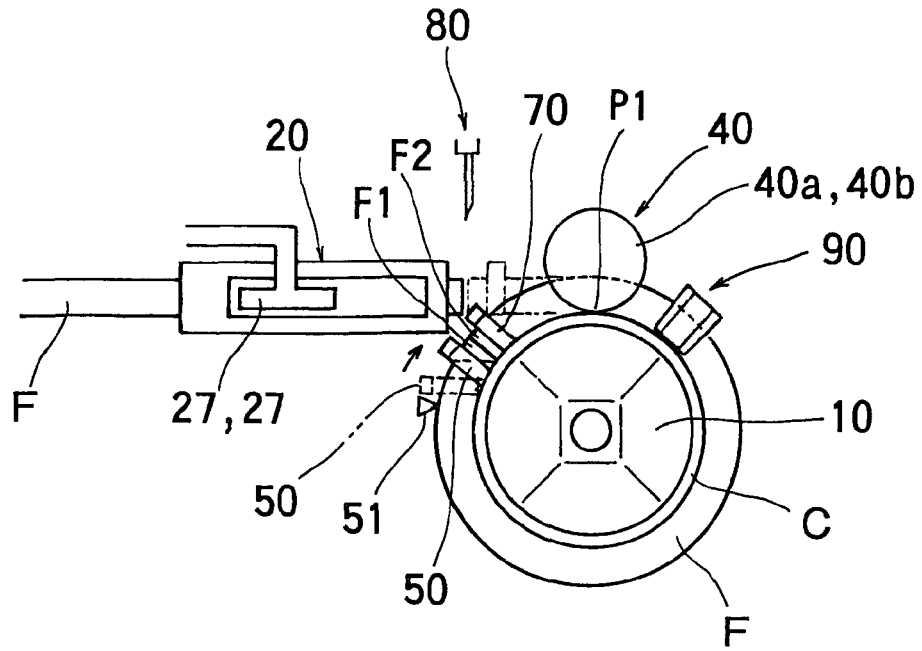
FIG. 20F is a view illustrating a state, in which the filler rubber is stuck to the bead core.
Figure 20G:
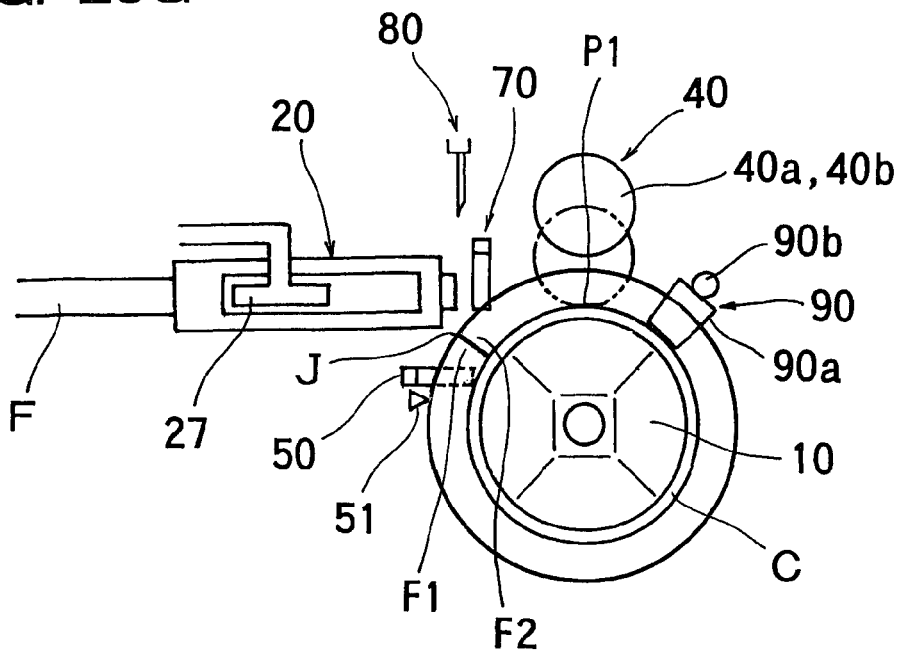
FIG. 20G is a view illustrating a state, in which the filler rubber is stuck to the bead core.
Figure 21:
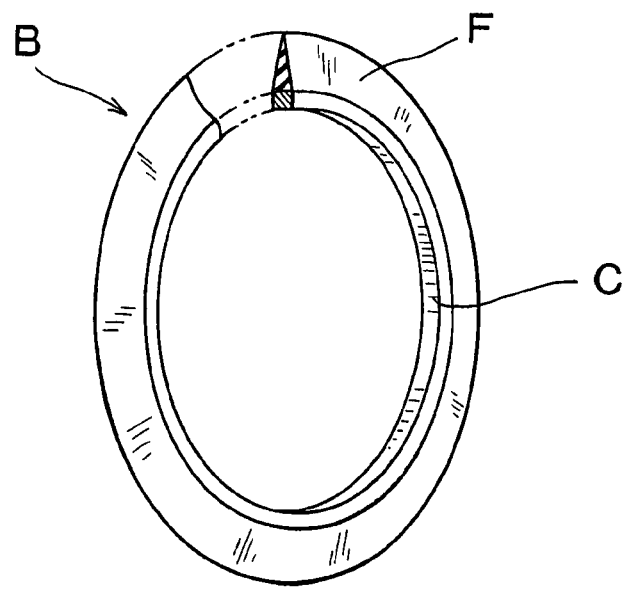
FIG. 21 is a perspective view showing a tire bead with a portion thereof cut.
Figure 22:
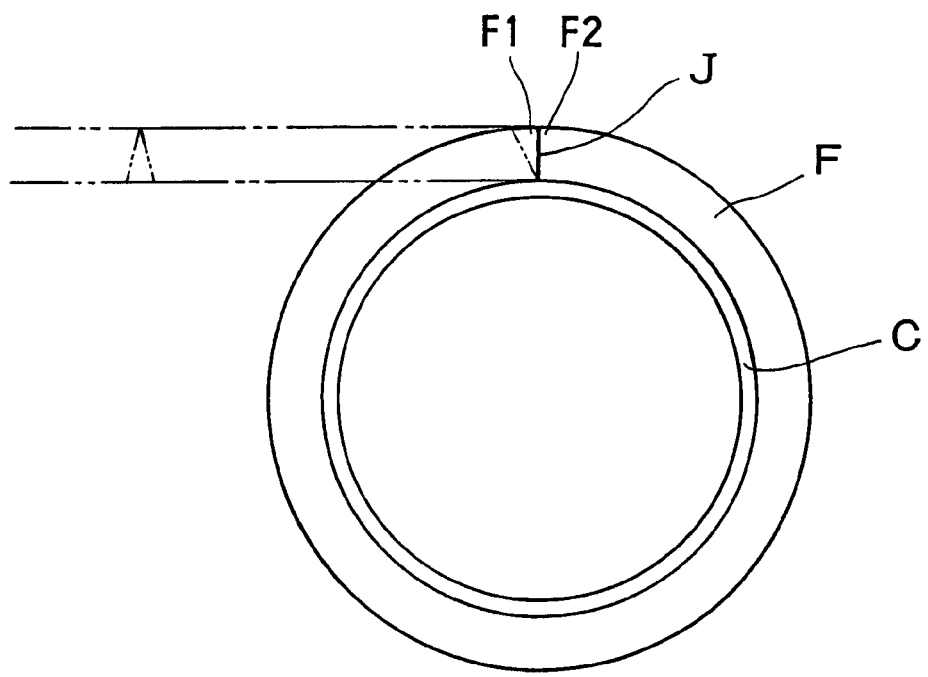
FIG. 22 is a view illustrating a state, in which a filler rubber is wound round a bead core of a tire bead.

B: tire bead, C: bead core, F: filler rubber, F1: leading end of filler rubber, F2: trailing end of filler rubber, J: joint portion, P1: reference position, W: wire, 1: sticking device, 2: supply unit of bead core, 3: supply unit of filler rubber, 4: conveyance means, 5: extruder, 6: festoon device, 7: running guide section, 8: device frame, 9: horizontal frame, 10: rotary support body, 11: hollow rotating shaft, 11a: flanged mount plate, 11b: guide member, 12: mount plate, 12a: guide portion, 13a: grooves, 13: support member, 14: operating shaft, 15: link member, 16: cylinder device, 17: drive motor, 18: rotation transmitting means, 19: support frame, 20: feeding device, 21: support frame, 22: linear guide, 23: feeding base, 23a: plate frame, 23b: timing belt, 24: guide plate, 24a: cut window, 25: linear guide, 26: rack mechanism, 27: interposing member, 28: air chuck mechanism, 29: bracket, 30: linear guide, 31: cylinder device, 32: cylinder device, 33: drive transmission shaft, 34, 35: timing pulley, 36: timing belt, 37: motor, 38: belt receiver, 39: push means, 40: pinch roller unit, 40a, 40b: pinch roller, 41: roller plate, 42: mount member, 43: screw shaft, 44: support member, 45: support bracket, 46: linear guide, 47: linear guide, 48: cylinder device, 50: first interposing means, 50a, 50b: interposing member, 51: sensor, 52: journal shaft, 53: base plate, 54: fulcrum shaft, 55: swing arm, 56: mount plate, 57: pinion, 58: rack, 59: cylinder device, 60: guide roller, 61: cylinder device, 62: cylinder device, 70: second interposing means, 70a: interposing member, 70b: interposing member, 71: pinion, 72: cylinder device, 73: rack, 74: arm member, 75: cylinder device, 80: cutting device, 81: cutter blade, 90: interposing pressure roller unit, 90a, 90b: interposing pressure roller, 91: bracket, 92: support shaft, 93: roller body, 94: cam roller, 95: cylinder device, 96: arm, 97: shaft portion, 98: cylinder device

The invention claimed is:

1. An apparatus for manufacturing a tire bead formed by sticking a filler rubber in an upright posture, which is extrusion-molded to be triangular-shaped in cross section, to an outer peripheral surface of a ring-shaped bead core, the apparatus comprising a rotary support body that supports a ring-shaped bead core supplied one by one from an inner periphery thereof and can rotate, the rotary support body being radially expansible and contractable, a feeding device that feeds the filler rubber, which is extrusion-molded to be triangular-shaped in cross section and supplied in a lengthy configuration, tangentially to a reference position, in which sticking to the outer peripheral surface of the bead core supported by the rotary support body begins, in an upright posture, a pair of pinch rolls that push both sides of a base of the filler rubber thus fed against the outer peripheral surface of the bead core in the reference position on the outer peripheral surface of the bead core to stick the same thereto, the pinch rolls cooperatively rotating in conjunction with the rotary support body, first interposing means for gripping the neighborhood of the leading end of the filler rubber stuck to the outer peripheral surface of the bead core from both sides when the leading end of the filler rubber reaches a position of a predetermined angle of rotation less than a single circumference from the reference position and rotation by the rotary support body is stopped, second interposing means for gripping the neighborhood of a trailing end having a length corresponding to a single circumference of an outer periphery of the bead core, and a cutting device that cuts the filler rubber which is gripped by the second interposing means in the neighborhood of trailing end thereof to the length corresponding to the single circumference on a more feeding device side than the second interposing means, and wherein the second interposing means can move the trailing end to a position opposed to the leading end on the outer periphery of the bead core in a state of gripping the neighborhood of the trailing end of the filler rubber thus cut, the first interposing means can be displaced toward a second interposing means side from a position of the opposed state after the movement of the trailing end, and is provided to butt end surfaces of the leading end and the trailing end of the filler rubber against each other owing to the displacing operation to join the same, wherein a pair of interposing pressure rollers are provided a little forwardly in the rotational direction of the pinch rollers in the reference position to press the filler rubber including a joint portion from both sides the pair of interposing pressure rollers being openable and closeable, and further wherein each of the first and second interposing means is provided separately from the rotary support body, and the first interposing means and the second interposing means operate independently from one another.

2. The apparatus for manufacturing a tire bead, according to claim 1, wherein the first interposing means for gripping the neighborhood of the leading end of the filler rubber is provided to grip the leading end of the filler rubber, which is inclined rearward in a direction of rotation due to winding around the outer peripheral surface of the bead core, in a direction conformed to the inclination and provided to be able to make a turning displacement about a fulcrum shaft in the vicinity of an inner periphery of the bead core to the other side so that the filler rubber is elongated from an outer circumferential edge thereof.

3. The apparatus for manufacturing a tire bead, according to claim 2, further comprising a sensor that detects when the leading end of the filler rubber reaches a position of a predetermined angle of rotation less than a single circumference from the reference position, and wherein rotation by the rotary support body is stopped on the basis of a detection signal of the leading end by the sensor.

4. The apparatus for manufacturing a tire bead, according to claim 2, wherein the first interposing means for gripping the neighborhood of the leading end of the filler rubber is positioned in a position of a rotation angle less than a single circumference but equal to or larger than 270° from the reference position and to perform a gripping motion to grip the neighborhood of the leading end of the filler rubber when rotation by the rotary support body is stopped.

5. The apparatus for manufacturing a tire bead, according to claim 1, further comprising a sensor that detects when the leading end of the filler rubber reaches a position of a predetermined angle of rotation less than a single circumference from the reference position, and wherein rotation by the rotary support body is stopped on the basis of a detection signal of the leading end by the sensor.

6. The apparatus for manufacturing a tire bead, according to claim 1, wherein the first interposing means for gripping the neighborhood of the leading end of the filler rubber is positioned in a position of a rotation angle less than a single circumference but equal to or larger than 270° from the reference position and to perform a gripping motion to grip the neighborhood of the leading end of the filler rubber when rotation by the rotary support body is stopped.

* * * * *